(12) United States Patent
Howard

(10) Patent No.: US 11,520,560 B2
(45) Date of Patent: Dec. 6, 2022

(54) COMPUTER PROCESSING AND OUTCOME PREDICTION SYSTEMS AND METHODS

(71) Applicant: Kevin D. Howard, Mesa, AZ (US)

(72) Inventor: Kevin D. Howard, Mesa, AZ (US)

(*) Notice: Subject to any disclaimer, the term of this patent is extended or adjusted under 35 U.S.C. 154(b) by 379 days.

(21) Appl. No.: 16/730,607

(22) Filed: Dec. 30, 2019

(65) Prior Publication Data

US 2020/0210162 A1 Jul. 2, 2020

Related U.S. Application Data

(60) Provisional application No. 62/786,951, filed on Dec. 31, 2018.

(51) Int. Cl.
| | |
|---|---|
| *G06F 8/41* | (2018.01) |
| *G06F 5/01* | (2006.01) |
| *G06F 16/2455* | (2019.01) |
| *G06F 17/15* | (2006.01) |

(52) U.S. Cl.
CPC ............ *G06F 5/01* (2013.01); *G06F 8/443* (2013.01); *G06F 8/45* (2013.01); *G06F 16/24558* (2019.01); *G06F 17/156* (2013.01)

(58) Field of Classification Search
CPC . G06F 8/45; G06F 8/451; G06F 8/452; G06F 8/456; G06F 8/445; G06F 5/01; G06F 7/02; G06F 7/026; G06F 17/156
See application file for complete search history.

(56) References Cited

U.S. PATENT DOCUMENTS

| | | | |
|---|---|---|---|
| 7,133,950 B2 | 11/2006 | Olukotun | |
| 10,496,514 B2 | 12/2019 | Howard | |
| 11,194,575 B2 * | 12/2021 | Karve | G06F 9/30047 |
| 2008/0082933 A1 | 4/2008 | Howard et al. | |
| 2009/0055625 A1 | 2/2009 | Howard et al. | |
| 2010/0049941 A1 | 2/2010 | Howard | |
| 2010/0183028 A1 | 7/2010 | Howard et al. | |
| 2010/0251259 A1 | 9/2010 | Howard | |
| 2010/0325388 A1 | 12/2010 | Howard | |
| 2012/0036399 A1 | 2/2012 | Howard | |
| 2012/0066664 A1 | 3/2012 | Howard | |

(Continued)

FOREIGN PATENT DOCUMENTS

| | | | | |
|---|---|---|---|---|
| CN | 103874998 B | * | 2/2017 | G06F 8/30 |
| WO | 2001001219 A2 | | 1/2001 | |

(Continued)

OTHER PUBLICATIONS

Laercio Lima Pilla, Topology-Aware Load Balancing for Performance Portability over Parallel High Performance System, Porto Alegre, Apr. 2014, retrieved online on Mar. 9, 2022, pp. 1-125. Retrieved from the Internet: <URL: https://www.lume.ufrgs.br/handle/10183/94763>. (Year: 2014).*

*Primary Examiner* — Hanh Thi-Minh Bui

(74) *Attorney, Agent, or Firm* — Skaar Ulbrich Macari, P.A.

(57) ABSTRACT

Computer processing and outcome prediction systems and methods used to generate algorithm time prediction polynomials, inverse algorithm time prediction polynomials, determine race conditions, determine when a non-linear algorithm can be treated as if it were linear, as well as automatically generate parallel and quantum solutions from classical software or from the relationship between monotonic attribute values.

13 Claims, 19 Drawing Sheets

(56) References Cited

U.S. PATENT DOCUMENTS

| | | |
|---|---|---|
| 2012/0101929 A1 | 4/2012 | Howard |
| 2013/0254751 A1 | 9/2013 | Howard |
| 2013/0311543 A1 | 11/2013 | Howard |
| 2013/0325750 A1 | 12/2013 | Howard |
| 2013/0325860 A1 | 12/2013 | Howard |
| 2013/0332777 A1 | 12/2013 | Howard |
| 2013/0332903 A1 | 12/2013 | Howard |
| 2013/0332904 A1 | 12/2013 | Howard |
| 2013/0346807 A1 | 12/2013 | Howard |
| 2014/0025430 A1 | 1/2014 | Howard |
| 2014/0068464 A1 | 3/2014 | Howard et al. |
| 2014/0125683 A1 | 5/2014 | Howard |
| 2014/0198196 A1 | 7/2014 | Howard et al. |
| 2014/0282412 A1 | 9/2014 | Howard et al. |
| 2014/0298286 A1 | 10/2014 | Howard |
| 2014/0304684 A1 | 10/2014 | Howard |
| 2014/0310678 A1 | 10/2014 | Howard |
| 2014/0310680 A1 | 10/2014 | Howard |
| 2014/0310684 A1 | 10/2014 | Howard |
| 2014/0310689 A1 | 10/2014 | Howard |
| 2014/0344773 A1 | 11/2014 | Howard |
| 2014/0372966 A1 | 12/2014 | Howard |
| 2015/0149535 A1 | 5/2015 | Howard |
| 2016/0085512 A1 | 3/2016 | Howard |
| 2016/0148102 A1 | 5/2016 | Howard |
| 2016/0188299 A1 | 6/2016 | Howard |
| 2016/0226658 A1 | 8/2016 | Howard |
| 2019/0114557 A1* | 4/2019 | Ashrafi .................. G06N 3/063 |
| 2020/0097951 A1 | 3/2020 | Abramson et al. |
| 2020/0151682 A1 | 5/2020 | Hurry et al. |
| 2021/0019158 A1 | 1/2021 | Howard |
| 2021/0142143 A1 | 5/2021 | Howard |

FOREIGN PATENT DOCUMENTS

| | | |
|---|---|---|
| WO | 2003060748 A2 | 7/2003 |
| WO | 2005111843 A2 | 11/2005 |
| WO | 2012021523 A2 | 2/2012 |
| WO | 2012024435 A2 | 2/2012 |
| WO | 2013036824 A2 | 3/2013 |
| WO | 2013184952 A1 | 12/2013 |

* cited by examiner

| Scaled Coordinate Values, $a$ inverse | Example Target Values with Inverses | | | | |
|---|---|---|---|---|---|
| | $t=\log_e a$ $a = e^t$ | $t=\log_2 a$ $a = 2^t$ | $t=a$ $a = t$ | $t=a^{1.5}$ $a = \sqrt[1.5]{t}$ | $t=a^2$ $a = \sqrt{t}$ |
| 1 | 0.000 | 0.000 | 1.000 | 1.000 | 1 |
| 2 | 0.693 | 1.000 | 2.000 | 2.828 | 4 |
| 3 | 1.099 | 1.585 | 3.000 | 5.196 | 9 |
| ... | ... | ... | ... | ... | ... |
| $n$ | $\log_e n$ | $\log_2 n$ | $n$ | $n^{1.5}$ | $n^2$ |

Inverse Terms as Second Column Header

Fig. 13

```
/**
 * One attribute, one loop per Lstruct, one Lstruct
 * @param x1    first attribute
 * @return result the calculated value of the input number
 */
double useCase1(int x1) {

// Static time codeblock 1
    double tempX1 = x1;
    double result = 1.0;

// Variable time codeblock 1
    for(double index1 = 1.0;index1 < tempX1;index1++) {
        result = index1*3.0+(result + index1)*index1;
        result /= 99.0;
        result = result*result;
    }

// Static time codeblock 2
    return result;
}
```

Fig. 16

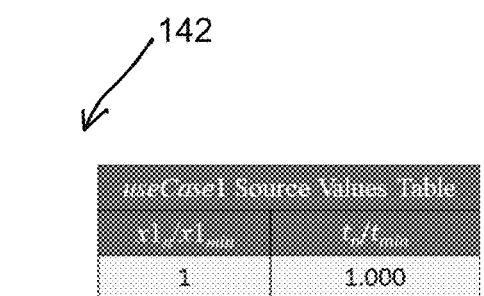

Fig. 17

```
/**
 * One attribute, one loop per Lstruct, one Lstruct
 * @param x1 - first attribute
 * @param x2 - second attribute
 * @return result the calculated value of the input number
 */
double useCase2(int x1, int x2) {        ← Input variables attribute used in loop
                                            control
    // Static time codeblock 1
    double tempX1 = x1;
    double tempX2 = x2;
    double result = 1.0;

// Variable time codeblock 1
    for(double index1 = 1.0; index1 < (tempX1+tempX2); index1++) {
        result = index1*3.0+(result + index1)*index1;
        result /= 99.0;                    Loop Control with
        result = result*result;            Hidden x1 & x2
    }

// Static time codeblock 2
    return result;
}
```

Fig. 20

| n | x2 | x1 = n*n | t1.N1... | t | t/t... |
|---|----|----------|----------|-----|--------|
| 16 | 1 | 187,500 | 1 | 156 | 1.0000 |
| 8 | 1 | 375,000 | 2 | 297 | 1.9038 |
| 4 | 1 | 750,000 | 4 | 625 | 4.0064 |
| 2 | 1 | 1,500,000 | 8 | 1266 | 8.1154 |
| 1 | 1 | 3,000,000 | 16 | 2515 | 16.1218 |

Fig. 21

| n | x1 | x2 = n*n | t/t2... | t | t/t... |
|---|----|----------|---------|-----|--------|
| 16 | 1 | 187,500 | 1 | 156 | 1.0000 |
| 8 | 1 | 375,000 | 2 | 313 | 2.0064 |
| 4 | 1 | 750,000 | 4 | 625 | 4.0064 |
| 2 | 1 | 1,500,000 | 8 | 1281 | 8.3333 |
| 1 | 1 | 3,000,000 | 16 | 2500 | 16.0256 |

Fig. 22

COMPUTER PROCESSING AND OUTCOME PREDICTION SYSTEMS AND METHODS

PRIORITY

This Application claims priority to and the benefit of U.S. Provisional Patent Application No. 62/786,951, filed Dec. 31, 2018, which is incorporated fully herein by reference.

TECHNICAL FIELD

The present invention relates generally to systems, methods, and computer programs for processing outcome predictions.

BACKGROUND OF THE INVENTION

Many seemingly disparate conventional software goods and services are not efficient or, in some cases, fail to provide any available options at all, for predicting values or outcomes pertaining to software timing, software parallelization, software analytics, quantum circuit encoding, projectile or vehicle intercept information, and the like. These concepts are treated as unrelated and require different toolsets. The toolsets required for the different software products can be very sophisticated, requiring an expensive specialist in difficult topics like Discrete Fourier Transformations, Partial Differential Equations, Artificial Intelligence, and the like. Some of the topics like true automatic transformation of serial software into strong parallel software without human intervention, general software processing time prediction from input values, and the general transformation of classic algorithms to quantum circuit capable algorithms, have not heretofore been possible. Only the weak software solution form or partial solution forms have been successfully accomplished.

As such, there is a need for new and improved computing systems and methods to address these deficiencies.

SUMMARY OF THE INVENTION

The systems and methods of the present invention provide linked techniques for a new non-linear, curve-fitting method that uses searches rather than calculations to build a polynomial that defines the best fit of a set of points to a curve, a new method by which to decompose a software source code such that the processing time of that code can be obtained, and a new method by which the execution path of software code can be known by examining the input variable values given to that code.

The techniques and methods of the present invention can be used to predict projectile or vehicle intercept times and locations, to automatically generate software timing and race condition tests, to parallelize a general software code, and to automatically generate parallel and quantum solutions from classical software or from the relationship between monotonic attribute values. Further, the present invention can generate various software analytics, including processing time, parallel processing speedup, parallel processing overhead, software power consumption. The present invention can also be used to solve other timing and processing resource needs or issues.

Aspects, methods, processes, systems and embodiments of the present invention are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further explain the principles of the disclosure and to enable a person skilled in the pertinent art to make and use the embodiments disclosed herein. In the drawings, like reference numbers indicate identical or functionally similar elements.

FIG. 5 shows an exemplary TALP creation using software units, in accordance with embodiments of the present invention.

FIG. 6 shows the creation an exemplary TALP Selection Function (TSF), in accordance with embodiments of the present invention.

FIG. 7 shows an exemplary table including example input attribute values and time, in accordance with embodiments of the present invention.

FIG. 8 shows an exemplary Source Value Table, in accordance with embodiments of the present invention.

FIG. 13 shows an exemplary dual header table illustrating obtaining the inverse function of each term at the same time as the function of each term is obtained, in accordance with embodiments of the present invention.

FIG. 16 shows exemplary code demonstrating static and variable processing times, in accordance with embodiments of the present invention.

FIG. 17 shows exemplary tables created for a first use case TALP to compare to a previously created Target Values Table to generate a time complexity function, in accordance with embodiments of the present invention.

FIG. 20 shows exemplary code for a second use case illustrating the creation of a time complexity function using multiple attributes, in accordance with embodiments of the present invention.

FIGS. 21-22 show exemplary tables of timing results for the second use case of FIG. 20, in accordance with embodiments of the present invention.

DETAILED DESCRIPTION OF PREFERRED EMBODIMENTS

Figure 1:
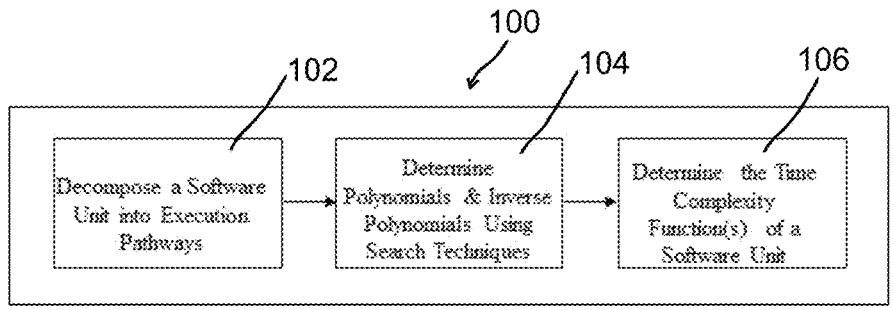
FIG. 1 shows a process for decomposing a software unit, generating polynomials, and generating the time complexity functions, in accordance with embodiments of the present invention.

Referring generally to FIGS. 1-40, exemplary aspects of computing systems and methods 100 for advanced outcome predictions is provided.

Various devices or computing systems can be included and adapted to process and carry out the aspects, computations, and algorithmic processing of the software systems and methods of the present invention. Computing systems and devices of the present invention may include a processor, which may include one or more microprocessors and/or one or more circuits, such as an application specific integrated circuit (ASIC), field-programmable gate arrays (FPGAs), etc. Further, the devices can include a network interface. The network interface is configured to enable communication with a communication network, other devices and systems, and servers, using a wired and/or wireless connection.

The devices or computing systems may include memory, such as non-transitive, which may include one or more non-volatile storage devices and/or one or more volatile storage devices (e.g., random access memory (RAM)). In instances where the computing devices include a microprocessor, computer readable program code may be stored in a computer readable medium or memory, such as, but not limited to drive media (e.g., a hard disk or SSD), optical media (e.g., a OVO), memory devices (e.g., random access memory, flash memory), etc. The computer program or software code can be stored on a tangible, or non-transitive, machine-readable medium or memory. In some embodiments, computer readable program code is configured such that when executed by a processor, the code causes the device to perform the steps described above and herein. In other embodiments, the device is configured to perform steps described herein without the need for code.

It will be recognized by one skilled in the art that these operations, algorithms, logic, method steps, routines, subroutines, and modules may be implemented in software, in firmware, in special purpose digital logic, and any combination thereof without deviating from the spirit and scope of the present invention as recited within the claims attached hereto.

The devices or computing devices may include an input device. The input device is configured to receive an input from either a user (e.g., admin, user, etc.) or a hardware or software component—as disclosed herein in connection with the various user interface or automatic data inputs. Examples of an input device include a keyboard, mouse, microphone, touch screen and software enabling interaction with a touch screen, etc. The devices can also include an output device. Examples of output devices include monitors, televisions, mobile device screens, tablet screens, speakers, remote screens, etc. The output device can be configured to display images, media files, text, video, or play audio to a user through speaker output.

Server processing systems for use or connected with the systems of the present invention, can include one or more microprocessors, and/or one or more circuits, such as an application specific integrated circuit (ASIC), field-programmable gate arrays (FPGAs), etc. A network interface can be configured to enable communication with a communication network, using a wired and/or wireless connection, including communication with devices or computing devices disclosed herein. Memory can include one or more non-volatile storage devices and/or one or more volatile storage devices (e.g., random access memory (RAM)). In instances where the server system includes a microprocessor, computer readable program code may be stored in a computer readable medium, such as, but not limited to drive media (e.g., a hard disk or SSD), optical media (e.g., a DVD), memory devices, etc.

1 Introduction

The ability to predict outcomes is a key concept behind many technologies. The present invention teaches techniques, systems, and methodologies for predicting outcomes, such as: a new non-linear curve-fitting method that uses searches rather than calculations to build a polynomial that defines the best fit of a set of points to a curve, a new way to decompose a software source code such that the processing time of that code can be obtained, a method by which the execution path of a software code can be known by examining the input variable values given to that code, etc.

The systems and methodologies 100 of the present invention can then be used, for example, to determine drone or missile intercept times and locations, to automatically generate software timing and race condition tests, to parallelize a general software code, and to automatically generate various software analytics. These software analytics can include processing time, parallel processing speedup, parallel processing overhead, software power consumption, parallel processing computational accuracy, and the like.

2 Techniques

Referring to FIG. 1, work for an algorithm is defined as how much time it takes that algorithm to process a given dataset. The techniques required for prediction purposes include decomposing a software unit (e.g., a software subroutine, module, or method) into a set of execution pathways 102, automatically generating polynomials given a set of independent values with their associated dependent variable values 104, and generating the time complexity function(s) of a software unit 106. The terms of each polynomial are found by searching a table of terms and applying the new non-linear curve-fitting method. It should be noted that in the table of terms, each row value of the adjacent column to the left of the current column must be greater than or equal to the current column, which ensures that a unique term will be found on each search.

2.1 Software Unit Timing Prediction

For the purposes of time prediction, the independent execution pathways in a software unit need to first be identified. Each execution pathway has identifiable input variable attributes and both non-loop-control and loop-control conditional statements. Variable attributes consist of all aspects of the variable, including variable type (int, char, float, etc.), values (current value, minimum value, maximum value), group type (scalar, array(dimensions)), dimensions (1, 2, 3, . . . d), and dimension sizes(x, y, z).

2.1.1 Time Affecting Linear Pathways

Consider the general definition of an algorithm: any sequence of operations that can be simulated by a Turing-complete system. An algorithm can contain multiple sequences of operations combined using conditional statements (if, switch, else, conditional operator, etc.) and organized as software units. With the present invention, data transformation results, timings and time predictions are associated with a particular pathway through the unit, implying that there can be multiple such results associated with any unit. Since a unit can contain multiple sequences of operations, the processing time of the unit is dependent on which sequence is selected and, thus, is temporally ambiguous—herein known as Turing's first temporal ambiguity (TFTA).

Consider a McCabe linearly independent pathway, a LIP. McCabe's LIP consists of linear sequences of operations, called code blocks, connected together using conditional statements with known decisions. A LIP is a simple algorithm within the body of the complex algorithm. A code block within a LIP contains any non-conditional statement, including assignment statements, subroutine calls, or method calls, but not conditional loops. A LIP treats each conditional loop as creating a separate pathway so changes in processing time due to changes in loop iterations cannot be tracked for the end-to-end processing time of the simple algorithm. Consider, however, that loops merely change the number of iterations of linear blocks of code, not the code blocks themselves, as the algorithm processes data end-to-end.

Since it is desirable to track changes in processing time for the end-to-end processing of an algorithm, and since changes in processing time are due to changes in the number of loop iterations (standard loops or recursion), the concept of a time-affecting linear pathway (TALP) includes loops as part of that pathway. That is, unlike a LIP, a TALP's code blocks can contain one or more loops. By allowing loops as part of the same pathway, it is possible to show how time can vary for the end-to-end linear processing of each pathway in each software unit of an algorithm. Calculating the timing changes from a TALP's input attribute values on a per-TALP basis allows for the resolution of TFTA.

Loop structures may be constructed using one or more "for", "do", "while", or "go to" statements, or from recursively called subroutines, functions, or methods. In programming there can also be hidden loops; for example, $x^y$ can be thought of as $\Pi_{i=1}^{y} x$, a loop of y iterations with an initial value of i=1 and an ending condition of i>y. If the y value is fixed then $x^y$ (for example: $x^2$) does not represent a hidden loop. The single loop or nested loops within a loop structure may contain two different types of conditional statements: loop control and non-loop control. Loop-control conditional statements are part of a loop's starting, ending, or iteration condition, so they are treated as part of the loop structure itself, not as a true conditional statement. That is, loop-control conditional statements do not create additional TALPs even if they are distributed within the loop. Non-loop-control conditional statements are not part of a loop's starting, ending, or iteration condition and are treated the same as any other conditional statement. Meaning, each branch of the condition creates a separate TALP. Note that loops without input variable attributes, or any associated dependent variable attributes, that affect loop-control conditions generate non-varying or static processing time, in the same way that $x^y$ with y fixed represents constant time.

Assignment statements are constants, variables, or arrays, linked together using logical and/or mathematical operators and produce values for variables or array dimensions and elements. These linked code blocks are appended to the code block that calls them, effectively substituting the contained code blocks for the subroutine, module and/or method calls. Note that code blocks that are not a part of a loop structure also generate non-varying or static processing time.

Figure 2:
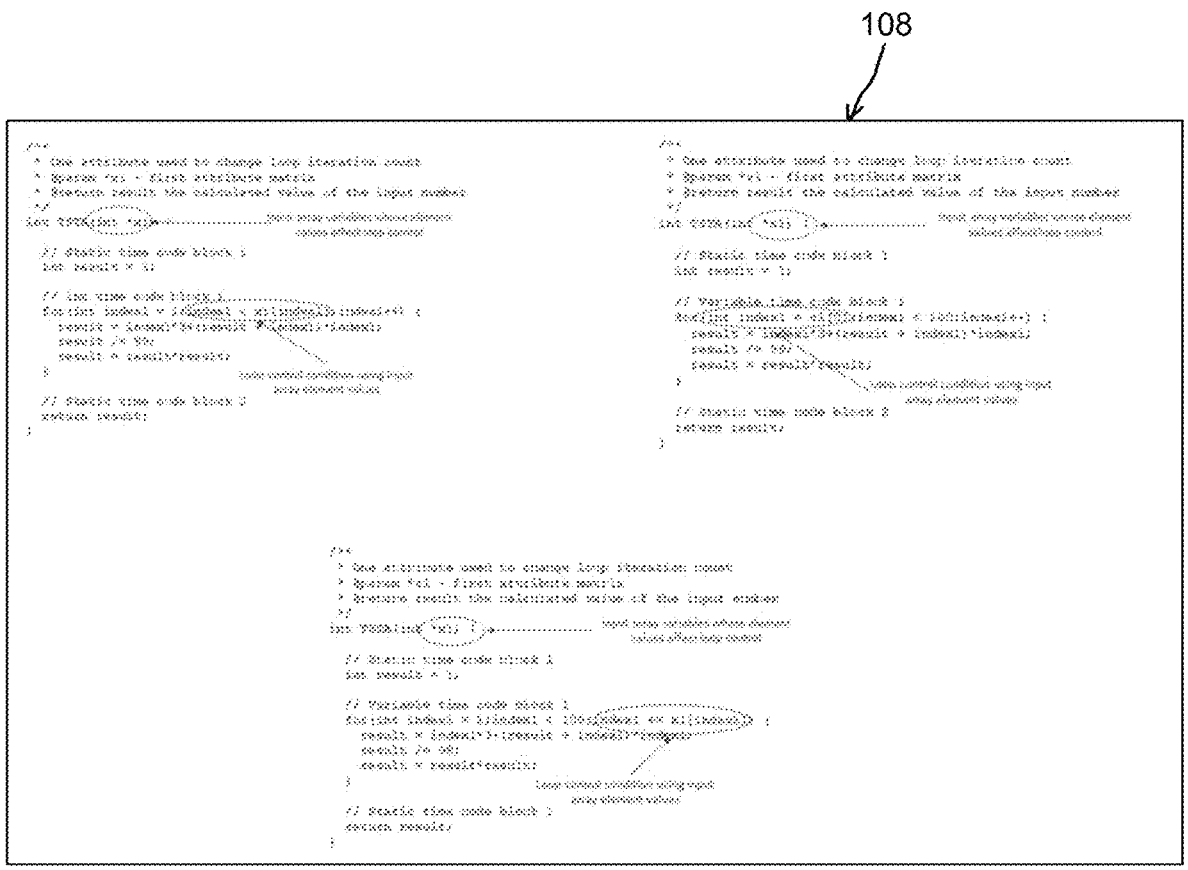
FIG. 2 shows an example of Turing's second temporal ambiguity, in accordance with embodiments of the present invention.

Consider that a loop within a TALP can have input variable attributes that affect that loop's number of iterations and thus the processing time of the TALP. Further consider that the input variable attribute affecting a loop's number of iterations could be an array-element value and not just an array's element index value. Then the processing time could appear random. This situation 108 is shown in FIG. 2 and is herein referred to as Turing's second temporal ambiguity (TSTA).

TALPs that exhibit TSTA 108, and whose loop indices are not modified with the loop structure, will complete in variable polynomial time. This means that although the TALP's processing will complete, the completion time is not generally predictable, so creating a timing polynomial is inadvisable. Variable polynomial time should be flagged. If a TALP's time-varying loop's index value is modified within the loop structure itself then it might or might not complete in polynomial time and should be flagged as possibly Turing incomplete, meaning that the algorithm might not finish processing, and thus, creating a timing polynomial is inadvisable. This is referred to herein as Turing's third temporal ambiguity, TTTA.

All TALPs that do not exhibit either TSTA or TTTA will complete processing in a fixed polynomial time. This means that a single polynomial generated by mapping input-variable attribute values to the loop-control conditions of the TALP can be used to predict its variable processing time.

Figure 3:
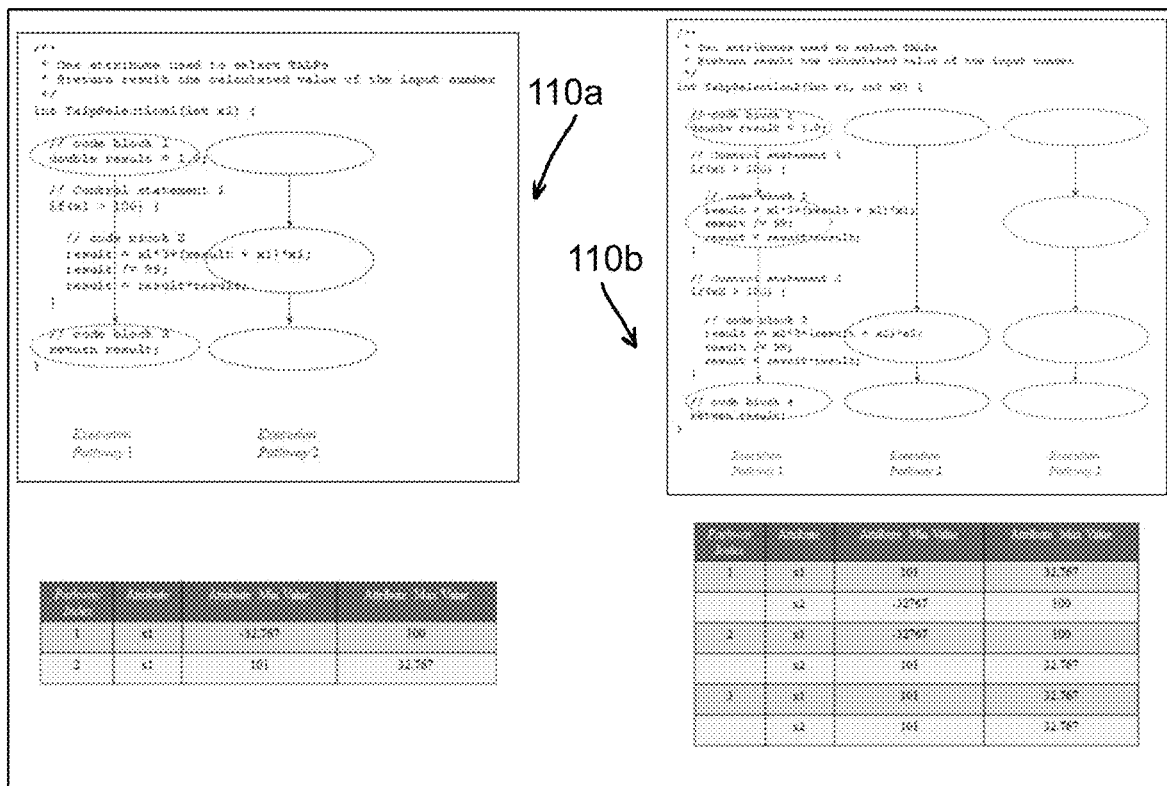
FIG. 3 shows multiple exemplary software units, and corresponding tables, for multiple pathways which will become time-affecting linear pathways (TALPs), in accordance with embodiments of the present invention.
Figure 4:
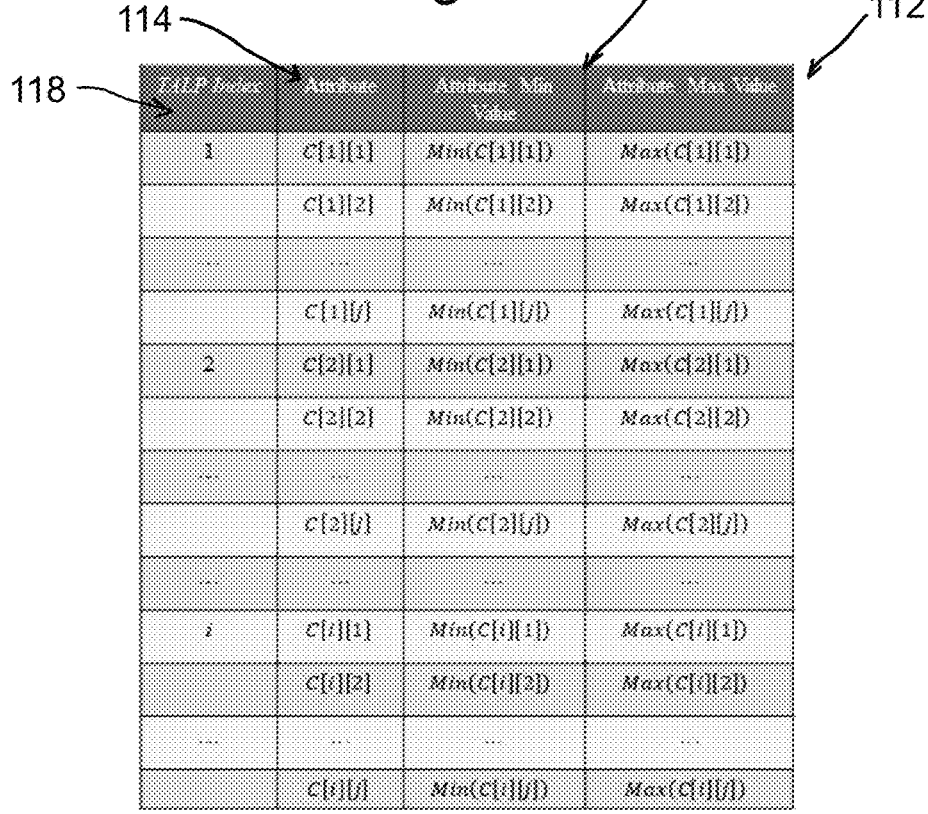
FIG. 4 shows an exemplary TALP Selection Table (TST), in accordance with embodiments of the present invention.

2.1.2 Automatic TALP Determination and Selection from Input Variable Attributes Referring to FIGS. 3-4, before processing time can be predicted, the TALPs and a method for selecting each TALP are identified. TALP determination requires mapping input-variable attribute values to non-loop-control conditions, not loop-control conditions. Non-loop-control conditions are those control conditions associated with if, switch, else, control operators, and like statements. Since a TALP represents a group of code blocks connected via non-loop-control conditional statements and all such statements test variable attribute values, it is possible to map the input variable attribute values to a particular TALP. As shown in FIG. 3, there are two software units 110a, 110b, each showing multiple pathways which will become TALPs.

All the input variable attributes of a software unit that are a part of the unit's non-loop-control conditional statements become members of the non-loop-control conditional set C.

$$C[i][j] = \begin{Bmatrix} (a_{1,1}), (a_{1,2}), \dots, (a_{1,j}), \\ (a_{2,1}), (a_{2,2}), \dots, (a_{2,j}), \\ \dots, \\ (a_{i,1}), (a_{i,2}), \dots, (a_{i,j}) \end{Bmatrix}$$

where a=the input variable attribute, i=the pathway index and j=the input variable attribute index As depicted in FIG. 4, a TALP Selection Table (TST) 112 is generated by the system 100 as follows:
1. All input variable attributes 114, or any associated dependent variable attributes, associated with each pathway that affect non-loop-control conditions are obtained from the set C.
2. The minimum and maximum values 116a, 116b of each input variable attribute 114 within the non-loop-control conditions are obtained via system 100 examination of the source code. If no minimum or maximum value is found for an attribute, then the minimum or maximum value of the data type of the attribute is used.
3. The pathway index, attribute names, and attribute minimum and maximum values are stored in the TST 112. Note that the pathway index becomes the TALP index 118 in the TST 112.

Figures 5, 6, 7, 8:
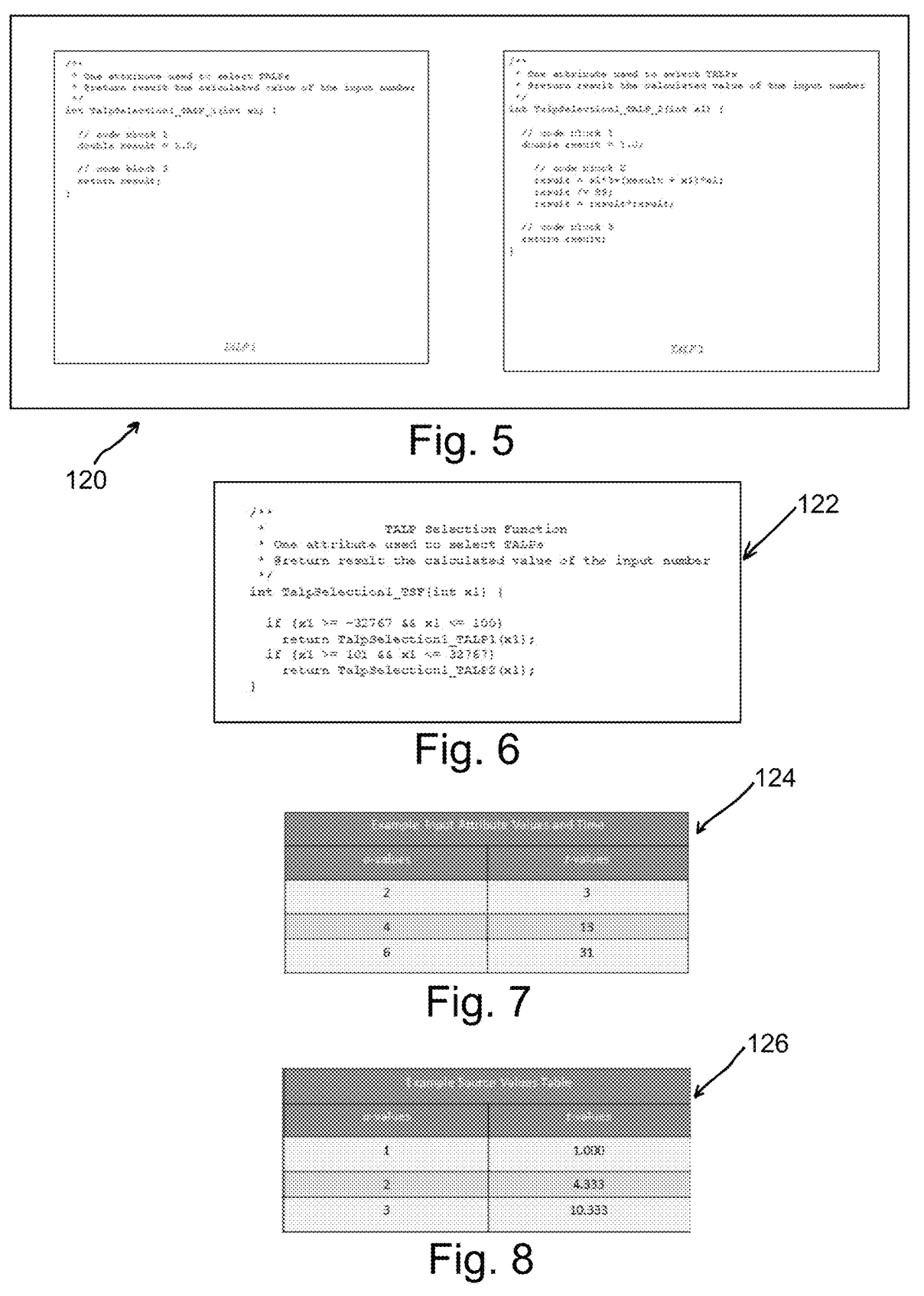

Referring to FIG. 5, the TALPs that are part of a software unit are created as follows:
1. The list of code blocks associated with each pathway, minus the non-loop-control conditions, is extracted. Note that the non-loop-control conditions are moved to the TALP Selection Function shown below.
2. New TALPs are identified with the original software unit names plus "TALP" plus the TALP index.
3. Each new TALP is filled with the extracted code blocks for that TALP.

FIG. 5 shows an exemplary TALP creation 120—using the software unit defined in and named TalpSelectionl(x1), the associated TALP is given.

Referring to FIG. 6, a TALP Selection Function (TSF) 122 is created using the values found in the TST and the non-loop-control statements for each TALP. The TSF 122 is then substituted for the original source-code subroutine, module or method call to the software unit. Note that the TSF 122 will be later modified for creating and executing parallel TALPs. A TSF 122 is required to select the correct TALP by using minimum and maximum value data from the TST and the input-variable attribute values received. FIG. 6 shows an exemplary creation of a TSF 122 using the TALPs created above.

2.1.2.1 TALP Attribute Domain and Range

Since a TALP represents a particular execution pathway through some algorithm, and since only a particular subset of input variable attribute values can be used to select a TALP, then the subset of input variable attribute values used to select a TALP is its Attribute Domain (AD). A TALP's AD generates a set of output variable attribute values which is the TALPs Attribute Range (AR).

TALPs can be linked together, called linked TALPs, if the preceding TALPs AR is a set or superset of the following TALP's AD. It should be noted that a TALP can contain a subroutine, method, or module (SMM) call. The list of TALP statements prior to the call is considered a pseudo TALP ending point. The attribute values of the TALP at the pseudo end-point are considered the Pseudo Attribute Range, or PAR. The called SMM is considered valid if the PAR matches at least one TALP within the called SMM. Since a valid called SMM only results in the activation of one of its TALPs, it is possible that some of its TALPs are never called within the algorithm. This condition, called a hanging SMM TALP, is predictable by tracking all TALPs in all SMMs and determining which are not selectable. If no TALP within an SMM is selectable then the condition is called a hanging SMM.

2.1.2.2 Loops Containing TALPs

A TALP can contain loops and SMMs. If an SMM is contained within a loop, the TALPs within the SMM are also contained within a loop. This is the same as the first statement of the TALP being a loop beginning and the last statement being the loop ending. Therefore, this "outer loop" interacts with any loop within the SMM TALPs multiplicatively. An SMM within a loop control condition serves only to change the number of loops performed. The loop count change depends on how the SMM interacts with the rest of the loop control conditions but does not cause the SMM to loop. Recursive SMM calls also cause a multiplicative interaction with any loop within a TALP of the SMM.

2.1.3 Automated Processing Time Prediction Polynomial Generation

Referring to FIGS. 7-12B, time prediction typically associates some data value with time. This association frequently takes the form a curve fit. Curve-fitting can take a great deal of processing and might not converge to a solution. The present invention makes it possible to generate a monotonic polynomial from a list of monotonic values, and their associated resultant monotonic values, using a binary search technique rather than relying only on calculations.

Figures 9, 10, 11:
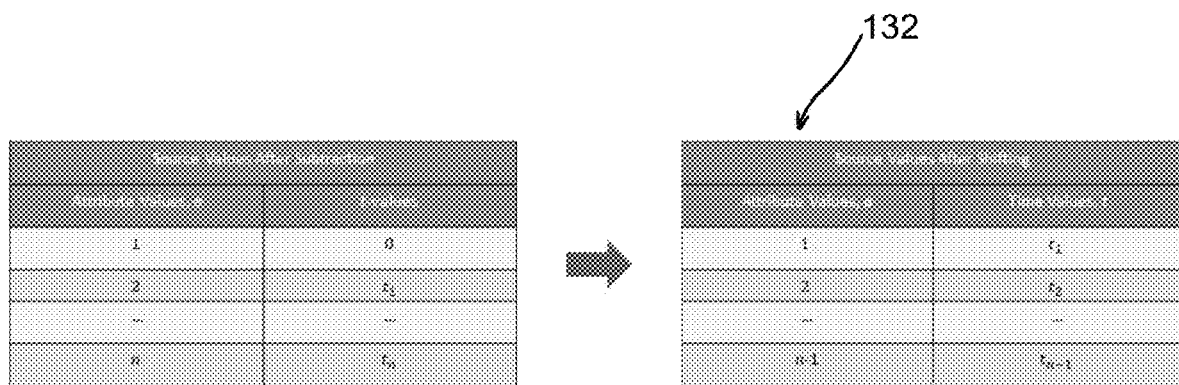
FIG. 9 shows an exemplary Target Values Table, in accordance with embodiments of the present invention.
FIG. 10 shows an exemplary new Source Values Table, in accordance with embodiments of the present invention.
FIG. 11 shows exemplary tables demonstrating row shifting based on computed zero values from a new Source Values Table, in accordance with embodiments of the present invention.

Though this curve-fitting method can be used with a different set of monotonic values and their associated monotonic results, here a Source Values Table 126 containing scaled input-variable attribute values and associated scaled monotonic processing time values is compared to a Target Values Table 128 containing sets of scaled attribute and associated time values generated from some pre-existing functions depicted as the column headers, following the steps below.
1. A value for an input variable attribute a is divided successively and executed by the system 100 to find the associated processing time values t, creating the table 124 of FIG. 7.
2. As shown in FIG. 8, the input attribute values a and associated processing time values t are scaled by their respective smallest received values, $a_{min}$ and $t_{min}$, and saved in the Source Values Table 126. Note that if the smallest a is already a one (1) then the t values are not scaled.
3. The time values t of the Source Values Table 126 are compared to those found in the previously created Target Values Table 128, as shown in FIG. 9.
4. The functions (polynomial terms) in the headers of the columns of the Target Values Table 128 are in ascending order. Any zero value in the Target Values Table 128 is not compared to its corresponding Source Values Table 126 time value, but not comparing a row does not eliminate the corresponding Target table column function header from consideration for inclusion in the final polynomial. When comparing the Source time values to corresponding Target time values, all Source t values in a column must be one of the following:
   a. Greater than or equal to all associated Target values in a column,
   b. Less than or equal to all associated Target values in a column, or
   c. All Source t values are the same value.
   The function header of any Target table column whose rows do not meet condition a or condition b above is eliminated from consideration for inclusion in the final polynomial, and a comparison is made using a different target column. If condition c is met, the value is considered a constant and added to the Saved Term List $f_{term}$. Condition c means the polynomial is complete, and the process jumps to Step 8.
5. When Source time values are compared to the corresponding Target time values, the closest column header that meets condition a or b is saved in the $f_{term}$ list and the process continues with Step 6. If no tested columns meet condition a or b then an error condition exists, and the "Error—stop processing" message is displayed. This comparison is a binary search process.
6. The selected Target column's values are subtracted from the corresponding Source time values, and those new values are saved in a temporary Source Values Table. If the temporary Source time values contain any negative values, then the next found polynomial term is negative. The absolute values of the temporary Source time values are saved as the new Source Values Table 130, as shown in FIG. 10.
7. If there are any computed zero values in the new Source Values Table 130, the values of the current column below the zero are shifted to the row above, replacing the zero value. Step 4 is then repeated at 132 using the new Source Values Table, as shown in FIG. 11.
8. All saved terms in the $f_{term}$ list are summed, creating the predictive, monotonic polynomial ℏ (a) for input variable attribute a. To un-scale this polynomial with its resulting scaled time t, it is multiplied by the smallest original t value, called $t_{min}$, within the original Source Values Table.

Unscaled ℏ $(a) = t_{min} \times \Sigma_{i=1}^{n} f_{term_i}$

Coefficients are automatically calculated from this step. Two or more like terms are summed to produce the coefficient of the term. For example, summing $t^2$ and $t^2$ gives $2t^2$.
9. To test the predictive, monotonic polynomial's accuracy, it is executed using the same values used to generate the original Source Values Table. The polynomial-computed values are compared to the actual values, giving the maximum percentage difference as the maximum error, $E_{max}$.

$$E_{max} = \max\left(\left\{\frac{|t_1 - ℏ(a_1)|}{t_1} \times 100, \frac{|t_2 - ℏ(a_2)|}{t_2} \times 100, \ldots, \frac{|t_i - ℏ(a_n)|}{t_i} \times 100,\right\}\right)$$

Figure 12A:
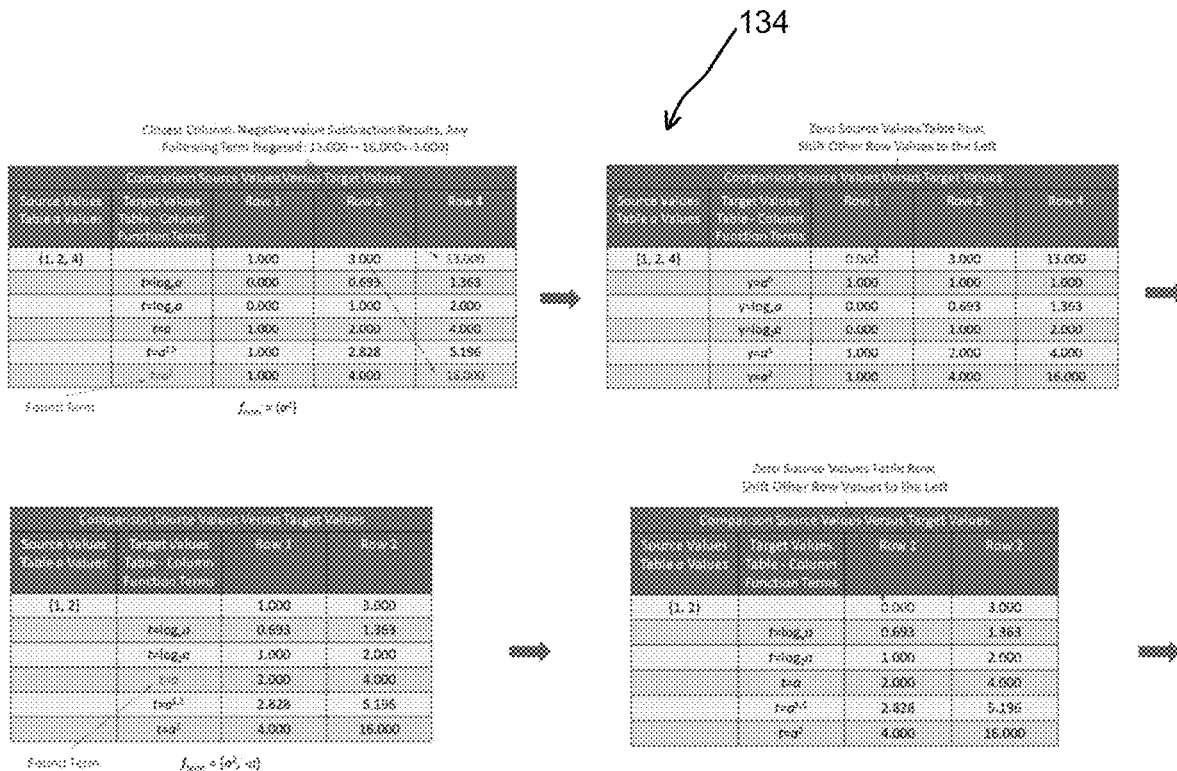
FIGS. 12A-12B show exemplary tables combining and comparing values from Source Value Tables and Target Value Tables, in accordance with embodiments of the present invention.
Figure 12B:
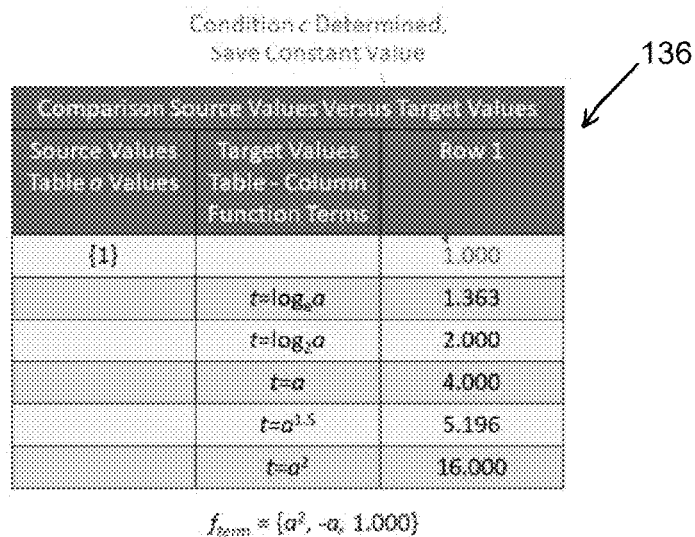
Figure 14:
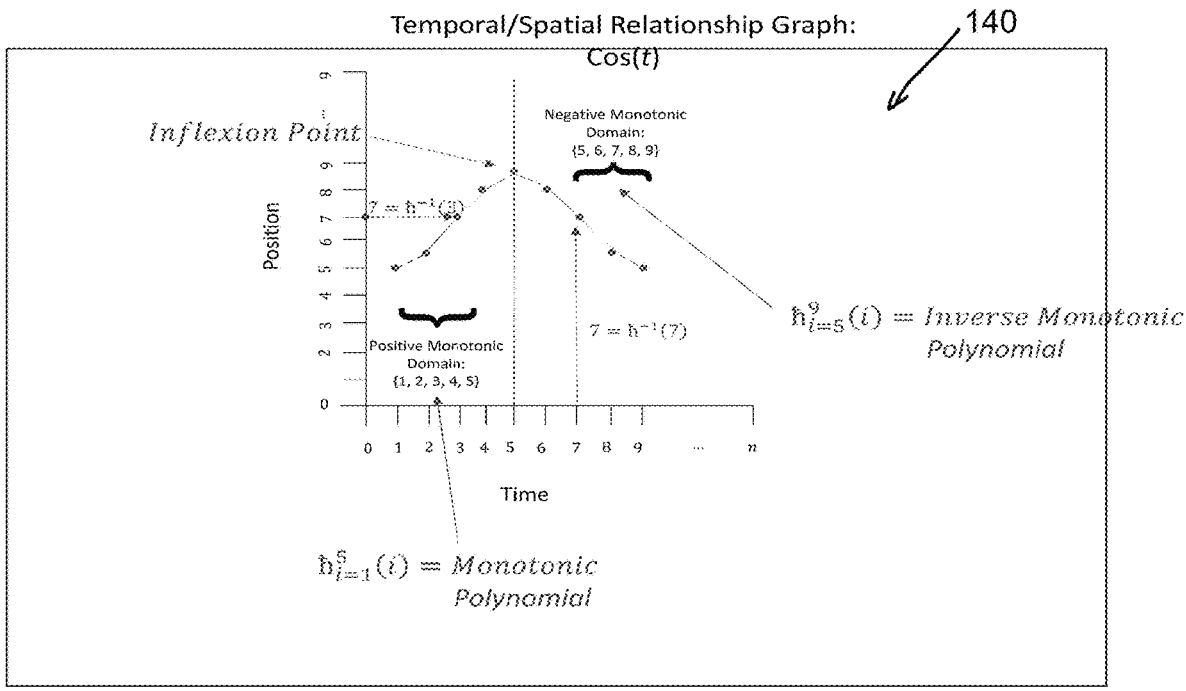
FIG. 14 shows an exemplary temporal/spatial relationship graph, in accordance with embodiments of the present invention.

Polynomial Generation Example:
   If the set of t values={1, 3, 13} and a={1, 2, 4} generated from $t = a^2 - a + 1$, the steps above are shown in the tables 134 of FIG. 12A. Note that these tables 134 combine the Source and Target table values in a modified format table 136, as shown in FIG. 12B.

$$\text{saved terms} = f_{term} = \{a^2, -a, 1.000\} \rightarrow \sum_{i=1}^{3} f_{term_i} \therefore$$

$$ℏ(a) = f_{term} = a^2 - a + 1 \quad Q.E.F.$$

$$E = \left\{\frac{|1-1|}{1} \times 100, \frac{|3-3|}{3} \times 100, \ldots, \frac{|13-13|}{13} \times 100\right\} =$$

$$\{0, 0, 0\} \rightarrow E_{max} = \max(E) = 0\%$$

2.2 Single Variable Monotonic Polynomial Inversion Solution

Referring to FIG. 13 and corresponding table 138, since the predictive, monotonic polynomial t=ℏ (a) discussed in Section 2.1.3 above uses values of a, the inverse a=ℏ$^{-1}$ (t) only generates values of a. If the generated single-variable h(a) contains a single term, the inverse is simply the inverse function of the detected term; for example, t=x$a^b$ has the inverse a=$(t/x)^{1/b}$. Note that x here represents a coefficient. By adding a second column header for the inverse of the found term, we can obtain the inverse function of each term at the same time as we obtain the function for each term.

The larger the function term, the smaller its inverse, perhaps causing the original smaller terms to dominate the potential inverse polynomial. For example, if h(a)=$a^3+a^2$ then the inverse generated from the sum of the inverse functions of each term would incorrectly give ℏ$^{-1}$(t)=$t^{1/3}$+ $t^{1/2}$. The smaller term, the inverse of $a^2$, incorrectly dominates; thus, this is not the inverse of the original polynomial.

Consider that all variable-containing terms have the required a value so that any variable-containing term could be used to solve for a. Since the inverse-polynomial problem discussed above is only a concern for the lower-order polynomial terms, the inverse of the highest-order polynomial term would be correct if it were the only term in the polynomial. Because of the polynomial monotonicity, there can only be a single solution. Referring again to table 138, given some t value, it is possible to find the associated a value of the highest-order term if the effects of any lower-order terms are removed.

The process for removing the effects of lower-order terms in finding the inverse differs depending on whether all polynomial terms are positive or at least one lower-order term is negative.

2.2.1 Polynomial Inversion Solution When All Terms are Positive

Given a polynomial containing all positive terms, if the highest-order that term gives t=x$a^b$ then its inverse gives a=$(t/x)^{1/b}$. Given some value t, the value a generated by the whole inverse polynomial is always greater than or equal to the a value generated from the highest-order term of the original polynomial. Removing the effects of the original lower-order terms to create the inverse polynomial can thus be accomplished by subtracting values from the given t value until the highest-order term, $(t/x)^{1/b}$, is an integer value, assuming that a contains only integer values. This leads to the following method for finding a=ℏ$^{-1}$(t):
   1. The inverse of the highest polynomial term is obtained.
   2. The t value is divided by the coefficient of the original term and the new value saved as temporary variable 1, $v_1$.

3. If temporary $v_1$ is not an integer, then one is subtracted from the value of t and saved as the new t. Step 2 is repeated.
4. The value of $v_1$ is placed into the inverse function of the highest polynomial term and a value calculated. If the calculation fails, and t is greater than zero, then one is subtracted from the value of t, saved as the new t, and Step 2 repeated. If the calculation fails and t equals zero, there is an error and processing is stopped. If the calculation succeeds, the newly calculated value is saved as the second temporary variable, $v_2$.
5. If $v_2$ is not an integer, one is subtracted from the value of t, the new y value saved, and Step 2 repeated.
6. The value c equals the value of integer $v_2$.

| If t = $ℏ$ (x) = $3x^3 + 2x^2 + x + 1$ and t = 35 then: | |
|---|---|
| 1. | $ℏ^{-1}(t) = (t/3)^{1/3}$ |
| 2. | $v_1 = 35/3 = 11.67$-not an integer, subtract one from t. |
| 3. | $v_1 = 34/3 = 11.33$-not an integer, subtract one from t. |
| 4. | $v_1 = 33/3 = 11.00$-an integer. |
| 5. | $v_2 = v_1^{1/3} = 2.224$-not an integer, subtract one from t. |
| 6. | $v_1 = 32/3 = 10.67$-not an integer, subtract one from t. |
| 7. | $v_1 = 31/3 = 10.33$-not an integer, subtract one from y. |
| 8. | $v_1 = 30/3 = 10.00$-an integer. |
| 9. | $v_2 = v_1^{1/3} = 2.154$-not an integer, subtract one from t. |
| 10. | $v_1 = 29/3 = 9.67$-not an integer, subtract one from t. |
| 11 | $v_1 = 28/3 = 9.33$-not an integer, subtract one from t. |
| 12. | $v_1 = 27/3 = 9.00$-an integer. |
| 13. | $v_2 = v_1^{1/3} = 2.080$-not an integer, subtract one from t. |
| 14. | $v_1 = 26/3 = 8.67$-not an integer, subtract one from t. |
| 15. | $v_1 = 25/3 = 8.33$-not an integer, subtract one from t. |
| 16 | $v_1 = 24/3 = 8.00$-an integer. |
| 17. | $v_2 = v_1^{1/3} = 2.00$-an integer. |
| 18. | $x = v_2$. |

∴ x = 2, check t = $3 \times 2^3 + 2 \times 2^2 + 2 + 1 = 35$ Q.E.F.

2.2.2 Polynomial Inversion Solution When At Least One Term is Negative

When the $ℏ$ (a)-generated polynomial contains at least one negative term, and the value of t is also negative, then rather than subtracting values from t as discussed in Section 2.2.1, values are added to t to create the inverse polynomial $ℏ^{-1}(t)$.

Below is an example of generating an inverse when the original polynomial has at least one negative term and t is a negative value:
$ℏ (a) < 0$

| If t = $ℏ$ (a) = $a^3 - a^2 - a$ and t = -1 then: | |
|---|---|
| 1. | $ℏ^{-1}(t) = (t)^{1/3}$ |
| 2. | $v_1 = -1/1 = -1$-an integer, but <0, add one to t |
| 3. | $v_1 = 1/1 = 1$-an integer, >0 |
| 4. | $v_2 = v_1^{1/3} = 1$-an integer |
| 5. | $a = v_2$ |

∴ a = 1, check $1^3 - 1^2 - 1 = -1$ Q.E.F.

Below is an example of a polynomial with at least one negative term but t is a positive value:
$ℏ (a) \geq 0$

| If t = $ℏ$ (x) = $5a^4 + 2a^3 - 2a^2 - 1$ and t = 440 then: | |
|---|---|
| 1. | $ℏ^{-1}(t) = (t/5)^{1/4}$ |
| 2. | $v_1 = 440/5 = 88.0000$-an integer >0 |
| 3. | $v_2 = v_1^{1/4} = 3.0628$-not an integer, subtract one from t. |
| 4. | Keep subtracting until $v_1 = 81$-an integer >0 |
| 5. | $v_2 = v_1^{1/4} = 3.000$-an integer |
| 6. | $a = v_2$ |

∴ a = 3, check $5 \times 3^4 + 2 \times 3^3 - 2 \times 3^2 - 1 = 440$ Q.E.F.

2.3 Piece-Wise Monotonic Polynomial Splines

The curve-fit shown above in Section 2.2 only works for monotonically changing input and output values. If the values do not change monotonically then they must be decomposed into multiple monotonic sets of values. For example, ½ of a period for a Cos ( ) function may look like the example 140 in FIG. 14.

One half of a Cos( ) period can be decomposed into two monotonic curves that are joined at the inflexion point. Similarly, the whole period can be decomposed into four monotonic curves joined by three inflexion points. To decompose the curve, all inflection points, that is, where an increasing curve starts to decrease or a decreasing curve starts to increase are first identified. Polynomial splines built between inflection points greatly decrease the computational order of each individual curve, avoiding Runge's phenomenon. The curves that increase are expressed as positive monotonic polynomials and the curves that decrease are expressed as negative monotonic polynomials. The domains of a domain limited monotonic polynomial is depicted as follows:

$a_{TALP}[x][i] = \{v_{x,1}, v_{x,2}, \ldots, v_{x,n}\}$
$t_{TALP} = ℏ_{i=start}^{end}(a_{TALP}[x][i])$ Where $a_{TALP}[x][i]$ = the $i^{th}$ value of the $x^{th}$ input attribute, $\{v_{x,1}, v_{x,2}, \ldots, v_{x,i}\}$ = the set of all values, the input attribute x, $t_{TALP}$ = the value of the current polynomial of the current TALP for input attribute x given the $i^{th}$ value of the that attribute.

This generates the single attribute spline:

$$t_{TALP} = ℏ_{i_1=start_1}^{end_1}(a_{TALP}[x][i_1]) \cup ℏ_{i_2=end_1+1}^{end_2}(a_{TALP}[x][i_2]) \cup \ldots \cup ℏ_{i_n=end_{n-1}+1}^{end_n}(a_{TALP}[x][i_n])$$

It should be noted that every polynomial, $ℏ$ ( ), in the spline can be different.

3 Automatic Time Prediction Polynomial Generation for TALPs

Figure 15:
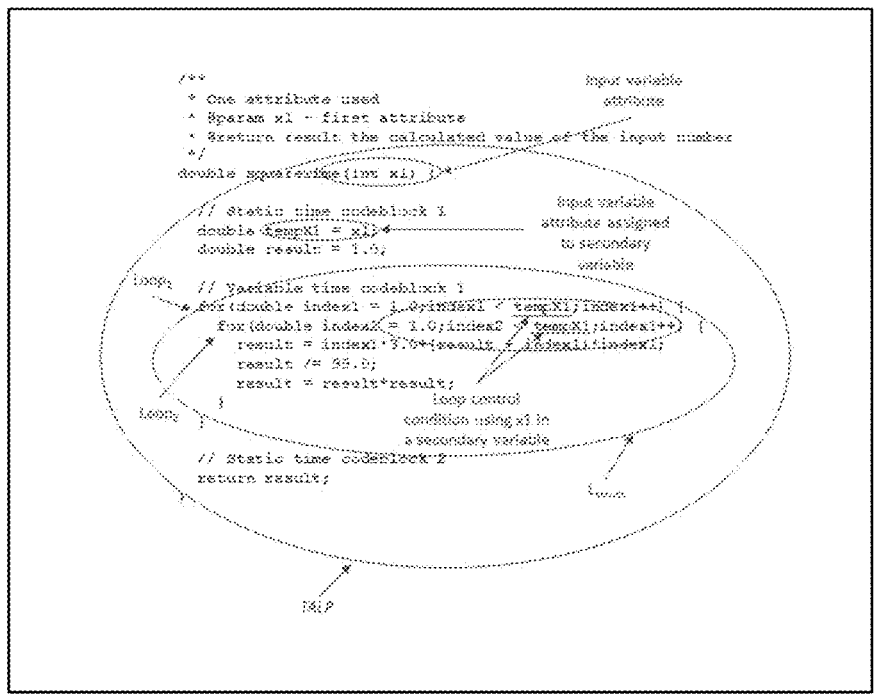
FIG. 15 shows exemplary code related to terms used in connection with TALP time prediction, in accordance with embodiments of the present invention.

As introduced in Section 2.1.1, there are several new and traditional concepts needed to perform TALP-execution time prediction. FIG. 15 relates code to the terms used.
1. A TALP is a linear pathway through a group of code blocks that includes loop structures as part of the same pathway.
2. An input variable attribute allows variable attribute values to enter the TALP.
3. Workload w is the list of input variable attributes that are used in loop-control conditions.
4. A loop-control condition can be a starting or ending condition, or both, of a loop.
5. A loop is a coding mechanism that allows code blocks to repeatedly execute, thereby varying the processing time.
6. An input variable attribute used in loop-control conditions varies the number of loop iterations and therefore processing time.
7. An $L_{struct}$ is a group of hierarchical, connected loops.

The set of input variables, each with one or more attributes per TALP, is denoted symbolically as the set $I_{unit_{TALP}}$ which can be shortened to $I_{TALP}$ if the unit is known:

$I_{TALP} = \{p_{1,1}, p_{1,2}, \ldots, p_{1,a}, p_{2,1}, p_{2,2}, \ldots, p_{2,a}, \ldots, p_{v,1}, p_{v,2}, \ldots, p_{v,a}\}$ where p=the input parameter for a TALP, v=the variable indicator, and a=the attribute indicator Note that $I_{TALP}$ includes all input variables, whether or not they affect loop-control conditions. The system 100 examination of the source code identifies any input variable attributes or any associated dependent variable attributes used in a loop's control condition within a TALP which are then transferred to a subset of $I_{TALP}$ called the workload set w:

$w=\{p_{1,1}, p_{1,2}, \ldots, p_{1,a}, p_{2,1}, p_{2,2}, \ldots, p_{2,a}, \ldots, p_{v,1}, p_{v,2}, \ldots, p_{v,a}\}$ Note that an individual element in the set w can be selected by exposing the element indexes, that is:

$w=w[v][a]=\{p_{1,1}, p_{1,2}, \ldots, p_{1,a}, p_{2,1}, p_{2,2}, \ldots, p_{2,a}, \ldots, p_{v,1}, p_{v,2}, \ldots, p_{v,a}\}$ where $w[1][2]=p_{1,2}$.

Consider that time complexity is defined as the relationship between input dataset size and processing time. As discussed above, an algorithm's input attribute values can affect the number of loop iterations and processing time. The processing time of an algorithm is always a function of the pathway taken through that algorithm, its executing TALP. This means that by using a set w per TALP instead of input dataset size per algorithm or even software unit, we can extend the concept of time complexity to the values of any input variable attribute, or multiple input-variable attributes, related to processing time, called Attribute Time Complexity (ATC). The ATC of an execution pathway includes both static and variable processing time. Static time is further defined in Section 3.1. The variable-time prediction polynomial, $\hbar_{TALP}(w)$, is defined to be a function that predicts the loop-varying processing time given some set w per TALP. It is the predictive monotonic polynomial $\hbar(a)$ of Section 2.1.3 but now specific to a TALP and the time-affecting attribute values in the set w.

Determining a variable-time prediction polynomial requires varying the values of the input variable attributes that affect time. Since the workload w is the set of input variable attributes that affect the loop-control conditions of a TALP, if the attribute values in w are divided into n pieces, w/n represented by $w_n$, as for the creation of the Source Values Table of Section 2.1.3, we get:

$$w_n = \frac{w}{n} = \frac{w[v][a]}{n} = \left\{\frac{p_{1,1}}{n}, \frac{p_{1,2}}{n}, \ldots, \frac{p_{1,a}}{n}, \frac{p_{2,1}}{n}, \frac{p_{2,2}}{n}, \ldots, \frac{p_{2,a}}{n}, \ldots, \frac{p_{v,1}}{n}, \frac{p_{v,2}}{n}, \ldots, \frac{p_{v,a}}{n}\right\}$$

As discussed previously, a loop is a coding mechanism that allows code blocks to repeatedly execute and, therefore, affect processing time. A loop structure, $L_{struct}$, consists of one or more loops. There can only be one non-hierarchical loop per $L_{struct}$. Two or more loops in an $L_{struct}$ are hierarchically connected. Note that loops can iterate a constant or variable number of times and that w attributes are only present in time-varying loops. A loop that does not contain an attribute in the set w generates additional non-varying, static processing time.

3.1 Single TALP Attribute Processing Time Predictor

Once a TALP is selected, consider when its workload set w contains a single time-affecting input variable attribute a. Following the process described in Section 2.1.3, the present invention creates a Source Values Table and compares it to a Target Values Table to generate the predictive polynomial $\hbar_{TALP}(a)$ as well as the minimum unscaled attribute value $a_{min}$ and the minimum unscaled processing time $t_{min}$. To use $\hbar_{TALP}(a)$, any new input attribute values for a must also be scaled by $a_{min}$ and must be greater than or equal to $a_{min}$. Using $\hbar_{TALP}(a)$ gives scaled time which must then be unscaled by multiplying by $t_{min}$.

$$t_v \times tu = \hbar_{TALP}\left(\frac{a}{a_{min}}\right) \times t_{min} \times tu$$

where $t_v$=varying processing time and tu=time units (microseconds, milliseconds, seconds, etc.)

As mentioned in Section 2.1.1, static time occurs when either a code block is not in a loop structure or when a loop structure's control conditions are not affected by input variable attribute values. The system 100 examination of the source code identifies these static loop structures and code blocks. The total static processing time $i_s$ is generated by executing and timing the static loops and code blocks.

$$t_s \times tu = (l_s + c_s) \times tu$$

where $l_s$=static loop structure processing time, $c_s$=static code block processing time Referring to FIG. 16, the total time complexity function of a specific TALP given some input variable attribute a, denoted by $T_{TALP}(a)$, includes both static and variable processing time. For some attribute a, using a minimum attribute size of $a_{min}$, $T_{TALP}(a)$ is shown below:

$$T_{TALP}(a) = \left(l_s + c_s + \hbar_{TALP}\left(\frac{a}{a_{min}}\right) \times t_{min}\right) \times tu = (t_s + t_v) \times tu$$

UseCase1, One Attribute, One Loop Per $L_{struct}$, One $L_{struct}$, No Significant Static Time.

Examining useCase1 shows that there is only one TALP. The set w for the useCase1 TALP is:

$w=\{x1\}$

The tables 142 of FIG. 17 are created from a valid set of values for x1 and the associated processing times for the useCase1 TALP and are used to compare to the previously created Target Values Table to generate the time complexity function $T_{useCase1}(x1)$.

$$T_{useCase1}(x1) \times ms = 0 + \hbar_{useCase1}\left(\frac{x1}{187500}\right) \times 157 \times ms \approx \frac{x1}{187500} \times 157 \times ms$$

The detected error percentage is given by:

$$E_p = \left\{\begin{array}{c} \frac{|157\text{ ms} - 157\text{ ms}|}{157\text{ ms}} \times 100, \frac{|313\text{ ms} - 314\text{ ms}|}{313\text{ ms}} \times 100, \\ \frac{|594\text{ ms} - 628\text{ ms}|}{594\text{ ms}} \times 100, \frac{|1219\text{ ms} - 1256\text{ ms}|}{1219\text{ ms}} \times 100, \\ \frac{|2484\text{ ms} - 2512\text{ ms}|}{2484\text{ ms}} \times 100 \end{array}\right\} =$$

$$\{0\%, 0.3\%, 5.7\%, 3\%, 1.1\%\} \therefore E_{max}(E_p) = 5.7\%$$

Given an acceptable error rate of 10%:

$$E_{max}(E_p)=5.7\%<10\% \rightarrow \text{a good curve fit}$$

3.2 Automatic Multiple TALP Attribute Processing Time Predictor

Multiple attribute TALP timing prediction differs from the single attribute case in that the timing effect for each attribute must be separately obtained then combined to give the variable processing time. In order to obtain separate timings for each attribute, only one attribute's value is varied, keeping the other attribute values fixed, when creating each Source Values Table. Note that there is maximum number of pieces n, called $n_{max}$, into which an attribute value can be split and still be greater than or equal to the minimum the value used to generate $ℏ_{TALP}(a_x)$, that is $a_{min}$. With multiple attributes in the set w, it is necessary to first find $n_{max}$ for each attribute and then use the smallest as the maximum possible n when creating the Source Values Tables. Because each generated variable-time prediction polynomial represents only one attribute, these functions are called partial $ℏ_{TALP}(w)$ functions, denoted as $∂ℏ_{TALP}(a_i)$ where $a_i$ is a particular attribute.

Figure 18:
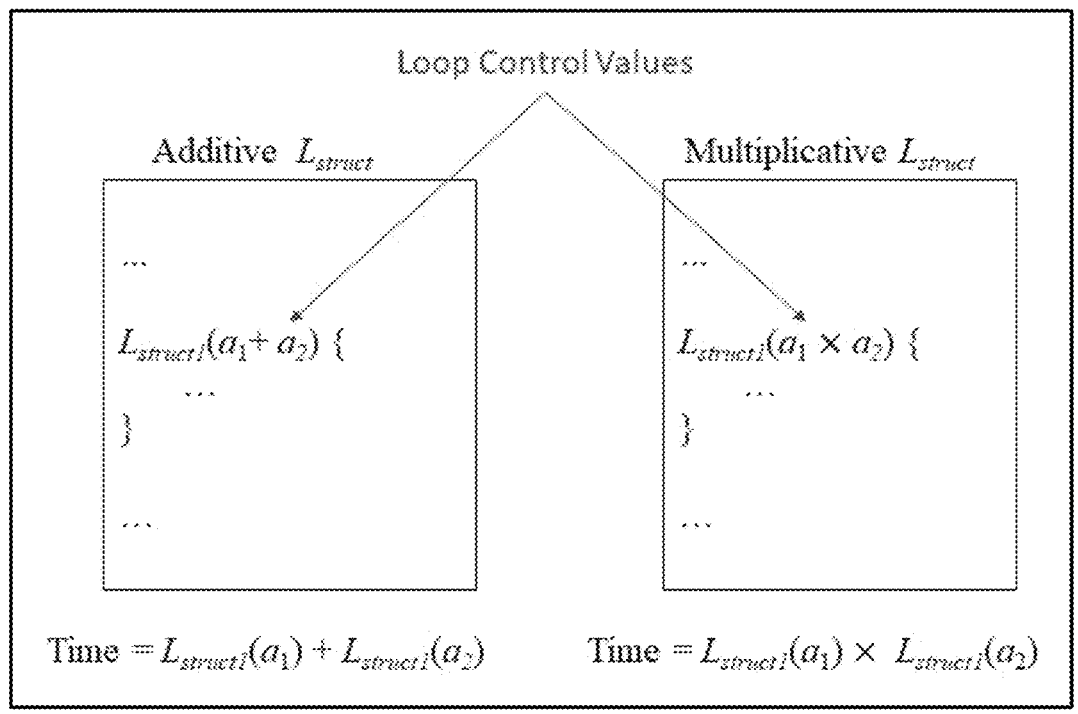
FIGS. 18-19 shows exemplary processing for multiple attribute TALP timing prediction, in accordance with embodiments of the present invention.

Referring to FIG. 18, how these partial functions are combined depends on the relationships of their associated attributes, denoted by $R_{TALP}(w)$. Within the control condition of a loop in a particular $L_{struct}$, examination of the source code by the system 100 shows when and how different attributes are combined via some function, addition, subtraction, power, etc.

Figure 19:
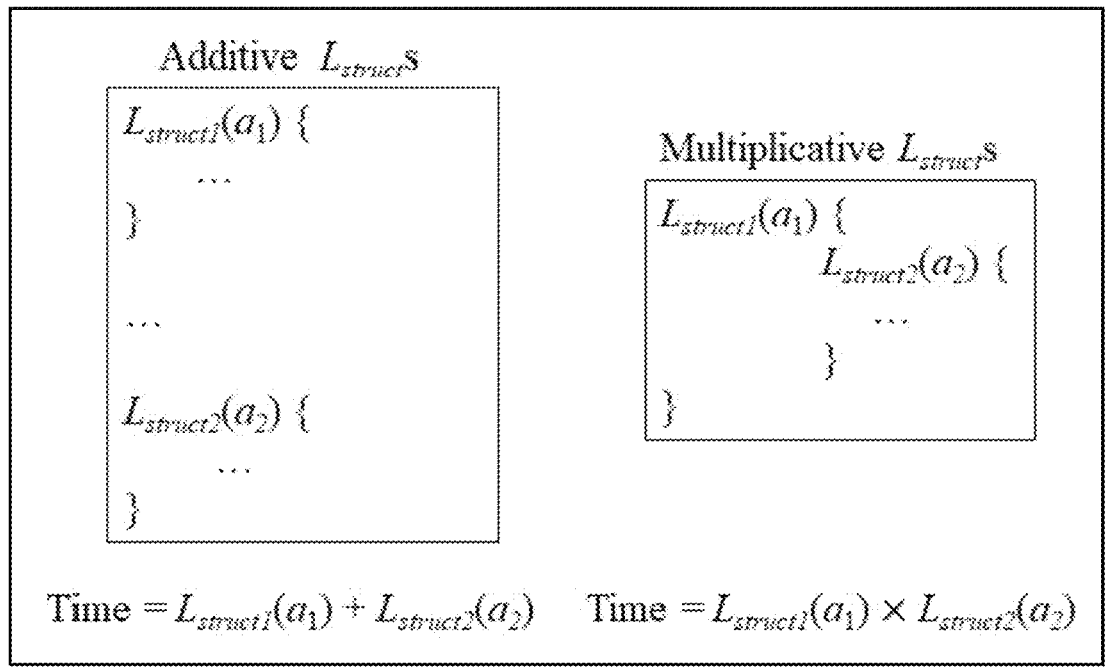

Referring to FIG. 19, in addition, two or more $L_{struct}$s with different attributes in their control conditions combine their effects, multiplicatively for hierarchical $L_{struct}$s and additively for non-hierarchical $L_{struct}$s of the same hierarchical level.

UseCase2, Two Attributes, One Loop Per $L_{struct}$, One $L_{struct}$, No Significant Static Time.

Referring to FIG. 20, this use case illustrates the creation of a time complexity function using multiple attributes, accomplished using the partial time complexity functions found for each variable attribute in w independently.

UseCase2 above shows more than one input variable attribute that affects processing time, that is:

w={x1, x2}

The timing results 144 of varying the value of x1 while fixing the value of x2 to one are shown in the table of FIG. 21.

A curve fit is performed using the value x1 of useCase2, giving the partial variable-time prediction polynomial:

$$∂ℏ_{useCase2}(x1) = \frac{x1}{187500} × 156$$

The results 146 of varying the values of x2 while fixing the value of x1 to one are shown in the table of FIG. 22.

A curve fit is performed using x2 in useCase2, giving the partial variable-time prediction polynomial.

$$∂ℏ_{useCase2}(x2) = \frac{x2}{187500} × 156$$

Examining the source code of useCase2, it can be seen that the loop whose control condition contains both x1 and x2 adds the values of the two attributes, meaning that the loop will be repeated x1+x2 times. Note that the relationship function for a loop with multiple attributes only applies to the input variable attributes that change the number of loop iterations.

The relationship between the partial variable-time prediction polynomials of useCase2 is:

$$R_{useCase2}(x1,x2) = ∂ℏ_{useCase2}(x1) + ∂ℏ_{useCase2}(x2)$$

Since $T_{useCase2}(w)$ represents both static and variable time, for the useCase2 TALP we get:

$$T_{useCase2}(w) × ms = (0 + R_{useCase2}(x1, x2)) × ms =$$
$$(0 + ∂ℏ_{useCase2}(x1) + ∂ℏ_{useCase2}(x2)) × ms =$$
$$\left(\left(\frac{x1}{187500}\right) × 156 + \left(\frac{x2}{187500}\right) × 156\right) × ms = \left(\frac{x1+x2}{187500}\right) × 156 × ms$$

4 Predictive Software Timing Tests

Figure 23:
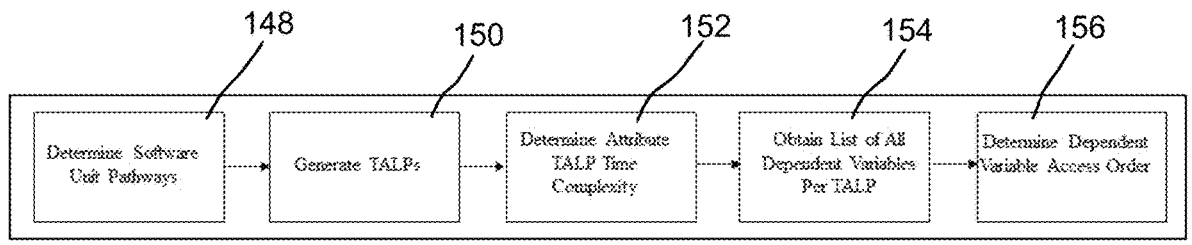
FIG. 23 shows an exemplary process relating to software timing tests, in accordance with embodiments of the present invention.

Typically, software test pattern recognition deals with spatial values: sizes, values, ranges, etc. Rarely are temporal patterns considered. This is true even though timing errors and race conditions remain the most difficult problems to address. There are two categories of timing tests: single algorithm and multi-algorithm. Single algorithm timing tests ensure that an algorithm or part of an algorithm (a subroutine, module, or method) completes within a certain amount of processing time. There are two types of multi-algorithm timing tests: total-completion-time tests and race-condition tests. Total-completion-time tests ensure that some set of algorithms complete processing within a certain time. Race-condition tests ensure that the access order to a common resource from multiple algorithms is correct. In order for a system to learn, predict, and isolate software execution timing errors, there must be a way to both perform dataset instance timing and generalize the instance timings into a predictive timing model this is accomplished using the techniques discussed above. As shown in FIG. 23, software unit pathways are determined at step 148, TALPs are generated at step 150, attribute TALP time complexity is determined at step 152, a list of all dependent variables per TALP are obtained at step 154, and dependent variable access order is determined at step 156.

Below, in Sections 4.1 and 4.2, are the steps used to create both predictive software-unit-level timing and race-condition tests.

4.1 Predictive Software Unit Level Timing Tests

Creating a predictive timing test requires the following steps:

1. The software is separated into multiple software test units (subroutines, modules, or methods) for testing.
2. The software units are separated into individual TALPs, and a TALP Selection Table is created unit.
3. TALPs can be accessed using the associated per-TALP index numbers.
4. For each TALP, the set of time-affecting attributes, w, is identified and then the following is performed:
   a. If there is a single attribute in w, the value is varied and the $ℏ_{TALP}(a_1)$ function generated, after which any timing error is determined by Step 3 below.
   b. If there are multiple attributes in w then the $∂ℏ_{TALP}(a_i)$ is generated for each attribute.
   c. The system 100 examines the source code of the TALP and generates the $R_{TALP}(w)$.
5. For each TALP, the generated $ℏ_{TALP}(w)$ or $R_{TALP}(w)$ function and the calculated $t_s$ are used to generate $T_{TALP}(w)$.

Once all TALPs of the software unit have predictive time-complexity functions, they can be used to test as follows:

1. A set of processing time requirements is entered.
2. A dataset for a TALP with an associated predictive time-complexity functions is entered, causing a time prediction to be generated for the input dataset.
3. If the predicted time is greater than the maximum or less than the minimum requirement then a predicted error has occurred. Otherwise, there is no predicted error.

4.2 Predictive Race Condition Unit Level Tests

A race condition can only occur between at least two TALPs and a resource such as a block of RAM. If one TALP must read or write to the resource before another then it is possible for a race condition to occur. Since a race condition is essentially a timing issue, it is possible to determine which TALPs in which software unit use the common resource and, thereby, determine the order of interaction. Creating a predictive race condition test requires the following steps:

1. Steps 1 through 5 above are used to create a predictive timing test. However, rather than timing from the beginning of the TALP to the end of the TALP, time is determined from the beginning of a TALP to where a resource is accessed, called a partial TALP. Read-access timings are kept separate from write-access timings. To ensure accurate results, the timing must be performed using a hardware timer.
2. Once the $T_{TALP}(w)$ functions have been generated for all read-write accesses of all TALPs of all software units, a set of requirements dictating the access order and type, read or write, of access is entered.
3. A dataset for each selected partial TALP is entered, causing a time prediction to be generated for the input datasets.
4. The read-write access times are sorted and those resources that are shared by more than one TALP are identified and matched.
5. The order and type of access is compared to the requirements.
6. If the access order and type match the requirements, there is no predicted error;
otherwise, there is a predicted error.

5 Automatic Parallelization

Parallelization is the conversion of a software code such that it gains processing speed by being able to use multiple processing elements (PEs). This is currently laborious, expensive, and considered to give, at best, linear results according to Amdahl's Law. Parallelization requires that the work of an algorithm be spread evenly across the PEs. Single PE algorithms use Big-O notation to define how processing time changes with dataset size. For example, many image processing codes are $O(n^2)$, meaning that the processing time is the square of the input dataset size. Big-O notation is an off-shoot of the concept of time complexity which calculates the processing time of an algorithm as a function of input dataset size.

From time complexity and Big-O notation, decreasing the dataset size of an algorithm with a non-linear processing order will give a non-linear decrease in processing time. This means that decreasing the input dataset size by spreading work across multiple PEs would make Amdahl's Law incompatible with Big-O unless the algorithm is O(n), that is linear. Examining algorithms shows that it is not just the dataset size that changes the processing time: as discussed in Section 2.1.1, any input-variable attribute value that affects the number of loop iterations performed by the algorithm will change the processing time. Redefining time complexity of an algorithm to be a function of the value of input attribute values that affect loop iterations retains the original definition (since dataset size is an input attribute value), while allowing scalar, vector, and multiple input attributes to be used.

Figure 24:
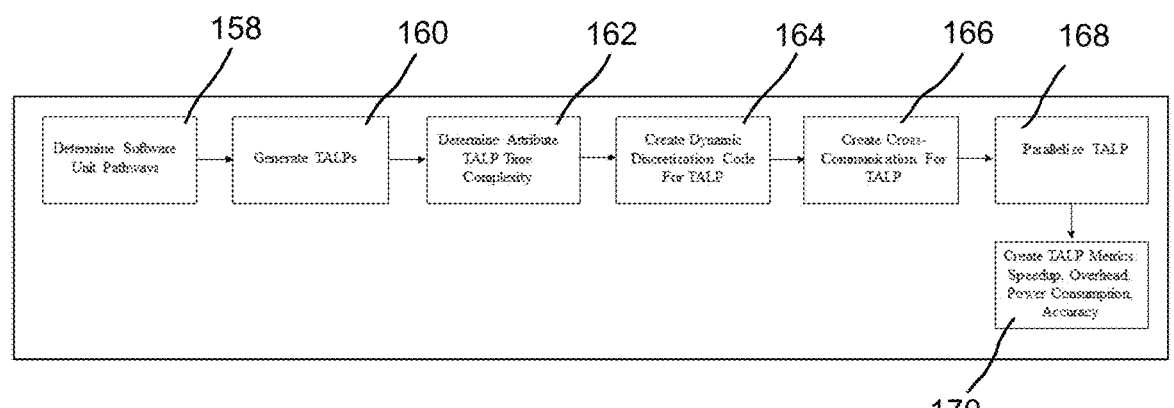
FIG. 24 shows an exemplary process relating to automatic software code parallelization, in accordance with embodiments of the present invention.

Using this expanded time complexity definition, which ties an algorithm's input variable attribute values to the number of loop iterations, in parallel processing means that parallel performance can vary dynamically with the attribute values. As illustrated in FIG. 24, software unit pathways are determined at step 158, TALPs are generated at step 160, attribute TALP time complexity is determined at step 162, dynamic discretization code for TALP is created at step 164, cross-communication for TALP is created at step 166, TALP parallelization occurs at step 168, and TALP metrics are created at step 170, including speedup, overhead, power consumption, and accuracy.

5.1 Parallel TALP Time Complexity

Since n represents the number of pieces into which each attribute value in set w is divided, or the number of PEs when one piece is executed per PE, and since $w_1/n$ is represented by $w_n$ as in Section 3, then n can be represented by $w_1/w_n$. As discussed in Section 3.2, $n_{max}$ is the maximum number of pieces into which w can be split, and each piece still be greater than or equal to the minimum value $w_{min}$ used to generate $T_{TALP}(w)$, that is, $w_{n_{max}} = w_{min}$ $$\frac{w_1}{w_n} = \frac{w_1}{\left(\frac{w_1}{n}\right)} = n, \; \frac{w_1}{w_{n_{max}}} = \frac{w_1}{w_{min}}$$

Therefore:

$$T_{TALP}(w_1, n) = \left(l_s + c_s + \hbar_{TALP}\left(\frac{\left(\frac{w_1}{w_{min}}\right)}{n}\right) \times t_{min}\right) \times tu = (t_s + t_v) \times tu$$

When $w_1$ divided by $w_{min}$ equals n, then the minimum possible processing time occurs, a condition called Serialized Parallel, regardless of the values of $w_1$. The number of processing elements required to create the Serialized Parallel condition is given by:

$$n = \frac{w_1}{w_{min}}$$

This means n must always be less than or equal to $w_1/w_{min}$.

5.2 Automatic TALP Run-Time Dataset Decomposition and Scattering

Since algorithmic work is how much time it takes an algorithm to process a given dataset and since the processing time can vary with the number of loop iterations, spreading algorithmic work evenly across multiple processing elements (PEs) requires replacing the TALP's original input variable attributes that affect variable time with the starting- and ending-value versions of those same attribute.

If the TALP index i is added to the set w of indices from the introduction of Section 3, we can describe the input attributes that affect time as w[input variable] [input variable attribute][TALP indicator].

Symbolically we get: w[input variable index][input variable attribute index][TALP] =

$$w[v][a][i] = \begin{cases} \{p_{1,1,1}, p_{1,2,1}, \ldots, p_{1,a,1}, p_{2,1,1}, p_{2,2,1}, \ldots, p_{2,a,1}, \ldots, p_{v,1,1}, p_{v,2,1}, \ldots, p_{v,a,1}\}, \\ \{p_{1,1,2}, p_{1,2,2}, \ldots, p_{1,a,2}, p_{2,1,2}, p_{2,2,2}, \ldots, p_{2,a,2}, \ldots, p_{v,1,2}, p_{v,2,2}, \ldots, p_{v,a,2}\}, \\ \ldots, \\ \{p_{1,1,n}, p_{1,2,i}, \ldots, p_{1,a,i}, p_{2,1,1}, p_{2,2,i}, \ldots, p_{2,a,i}, \ldots, p_{v,1,i}, p_{v,2,i}, \ldots, p_{v,a,i}\} \end{cases}$$

Also from Section 3 above, n represents the number of pieces (as well as the number of processing elements) into which an attribute value is divided, as for $p_{v,a}/n$ or the set of attribute values $w/n$ or $w_n$, to obtain process times to create a Source Values Table. As stated in Section 3.2, the maximum number of pieces n, into which an input-variable attribute value can be split and still be greater than or equal to the minimum value used to generate $\hbar_{TALP}(a_x)$, that is $a_{min}$ and is called $n_{max}$. It is necessary to first find $n_{max}$ for each attribute in the set w and then use the smallest as the maximum number of PEs that can be used for the set. With $w_i$ representing any attribute value in the set w where n=1, and since n can be represented by $w_1/w_n = w_1/(w_1/n) = n$, the system 100 of the present invention uses the following to find $n_{max}$ when there are multiple attributes in the set w:

$$n[i] = \frac{w_1[v][a][i]}{w_n[v][a][i]} = \begin{cases} \left\{ \left\{ \begin{array}{c} \frac{w_1[1][1][1]}{w_n[1][1][1]}, \frac{w_1[1][2][1]}{w_n[1][2][1]}, \\ \ldots, \frac{w_1[1][a][1]}{w_n[1][a][1]} \end{array} \right\}, \left\{ \begin{array}{c} \frac{w_1[2][1][1]}{w_n[2][1][1]}, \frac{w_1[2][2][1]}{w_n[2][2][1]}, \\ \ldots, \frac{w_1[2][a][1]}{w_n[2][a][1]} \end{array} \right\}, \ldots, \left\{ \begin{array}{c} \frac{w_1[v][1][1]}{w_n[v][1][1]}, \frac{w_1[v][2][1]}{w_n[v][2][1]}, \\ \ldots, \frac{w_1[v][a][1]}{w_n[v][a][1]} \end{array} \right\} \right\}, \\ \left\{ \left\{ \begin{array}{c} \frac{w_1[1][1][2]}{w_n[1][1][2]}, \frac{w_1[1][2][2]}{w_n[1][2][2]}, \\ \ldots, \frac{w_1[1][a][2]}{w_n[1][a][2]} \end{array} \right\}, \left\{ \begin{array}{c} \frac{w_1[2][1][2]}{w_n[2][1][2]}, \frac{w_1[2][2][2]}{w_n[2][2][2]}, \\ \ldots, \frac{w_1[2][a][2]}{w_n[2][a][2]} \end{array} \right\}, \ldots, \left\{ \begin{array}{c} \frac{w_1[v][1][2]}{w_n[v][1][2]}, \frac{w_1[v][2][2]}{w_n[v][2][2]}, \\ \ldots, \frac{w_1[v][a][2]}{w_n[v][a][2]} \end{array} \right\} \right\}, \\ \ldots, \\ \left\{ \left\{ \begin{array}{c} \frac{w_1[1][1][i]}{w_n[1][1][i]}, \frac{w_1[1][2][i]}{w_n[1][2][i]}, \\ \ldots, \frac{w_1[1][a][i]}{w_n[1][a][i]} \end{array} \right\}, \left\{ \begin{array}{c} \frac{w_1[2][1][i]}{w_n[2][1][i]}, \frac{w_1[2][2][i]}{w_n[2][2][i]}, \\ \ldots, \frac{w_1[2][a][i]}{w_n[2][a][i]} \end{array} \right\}, \ldots, \left\{ \begin{array}{c} \frac{w_1[v][1][i]}{w_n[v][1][i]}, \frac{w_1[v][2][i]}{w_n[v][2][i]}, \\ \ldots, \frac{w_1[v][a][i]}{w_n[v][a][i]} \end{array} \right\} \right\} \end{cases}$$

That is, for some particular TALP indicated by x, the maximum number of PEs that can be used for a given input dataset is given by:

$$n_{x,max} = \min(n[x]) = \min\left(\frac{w_1[v][a][x]}{w_n[v][a][x]}\right)$$

It is now possible to calculate the starting and ending values of each variable attribute of the set w for the TALP x to be processed by a particular PE n using the following:

$$\text{start}(w[v][a][x], n) = (n-1) \times \left(\frac{w[v][a][x]}{n_{x,max}}\right) + 1 \leftrightarrow n > 0 \wedge n \leq n_{x,max},$$

$$\text{end}(w[v][a][x], n) = n \times \left(\frac{w[v][a][x]}{n_{x,max}}\right) \leftrightarrow n \leq n_{x,max}$$

Replacing the variable attributes found in the set w with their equivalent starting and ending variable attribute values gives the new set ŵ:

$$\hat{w}[v][a][i] = \begin{cases} \left\{ \left((n-1) \times \left(\frac{p_{1,1,1}}{n_{1,max}}\right) + 1, n \times \left(\frac{p_{1,1,1}}{n_{1,max}}\right)\right), \ldots, \left((n-1) \times \left(\frac{p_{v,a,1}}{n_{1,max}}\right) + 1, n \times \left(\frac{p_{v,a,1}}{n_{1,max}}\right)\right) \right\}, \\ \left\{ \left((n-1) \times \left(\frac{p_{1,1,2}}{n_{2,max}}\right) + 1, n \times \left(\frac{p_{1,1,2}}{n_{2,max}}\right)\right), \ldots, \left((n-1) \times \left(\frac{p_{v,a,2}}{n_{2,max}}\right) + 1, n \times \left(\frac{p_{v,a,2}}{n_{2,max}}\right)\right) \right\}, \\ \ldots, \\ \left\{ \left((n-1) \times \left(\frac{p_{1,1,i}}{n_{i,max}}\right) + 1, n \times \left(\frac{p_{1,1,i}}{n_{i,max}}\right)\right), \ldots, \left((n-1) \times \left(\frac{p_{v,a,i}}{n_{i,max}}\right) + 1, n \times \left(\frac{p_{v,a,i}}{n_{i,max}}\right)\right) \right\} \end{cases}$$

The set $\hat{w}$ is used to create a function called the parallel TALP or $P_{TALP}(\hat{w})$ function which executes the TALP on each of the n PEs:

executed PE TALP=$P_{TALP}(*\hat{w}[v][a][i])$

Figure 25:
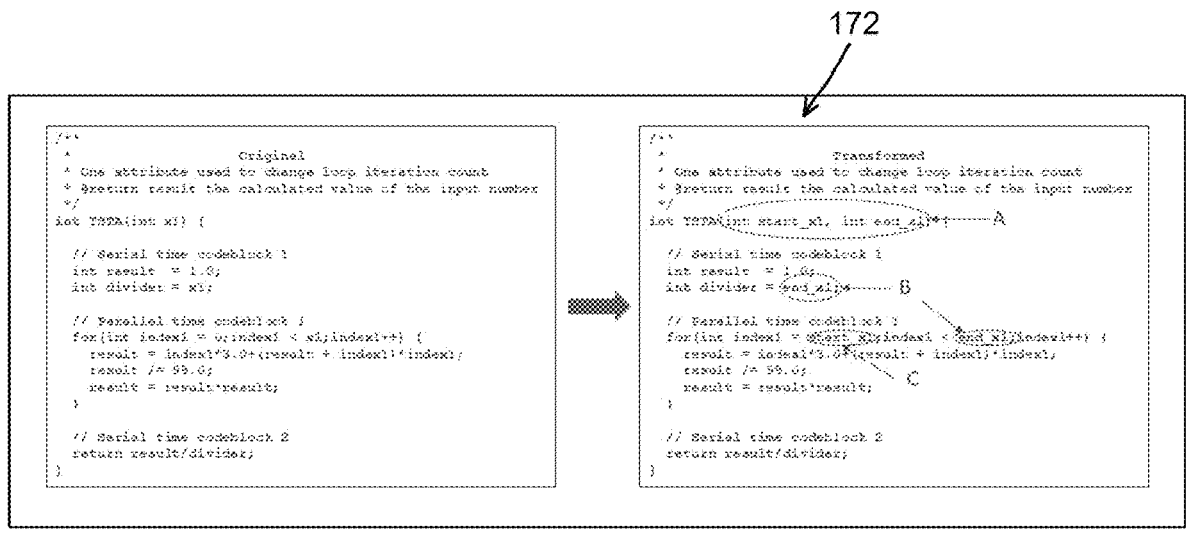
FIG. 25 shows an exemplary TALP modification, in accordance with embodiments of the present invention.

Note that the input parameters of each TALP are modified to accept the starting and ending values of each attribute in the set $\hat{w}$. The loop structures of the TALP are also modified to incorporate the starting and ending attribute values. An exemplary TALP modification 172 is shown in FIG. 25, where A=the transformed input variable attribute that used in w, B=the end value of the input variable attribute used as the loop-ending condition and as an independent variable within a dependent variable, and C=the start value of the input variable attribute used as the loop's initial condition.

5.3 Automatic Run-time Output Dataset Agglomeration

Algorithms generate a set of output variable attribute values o[output variable index] [output variable attribute index] [TALP indicator]. This is depicted symbolically as:

$o$[output variable index][output variable attribute index][$TALP$] =

$$o[v'][a'][i] = \begin{cases} \{p_{1,1,1}, p_{1,2,1}, \ldots, p_{1,a,1}, p_{2,1,1}, p_{2,2,1}, \ldots, p_{2,a',1}, \ldots, p_{v',1,1}, p_{v',2,1}, \ldots, p_{v',a',1}\}, \\ \{p_{1,1,2}, p_{1,2,2}, \ldots, p_{1,a',2}, p_{2,1,2}, p_{2,2,2}, \ldots, p_{2,a',2}, \ldots, p_{v',1,2}, p_{v',2,2}, \ldots, p_{v',a',2}\}, \\ \ldots, \\ \{p_{1,1,i}, p_{1,2,i}, \ldots, p_{1,a',i}, p_{2,1,1}, p_{2,2,i}, \ldots, p_{2,a',i}, \ldots, p_{v',1,i}, p_{v',2,i}, \ldots, p_{v',a',i}\} \end{cases}$$

Since there is a relationship between some subset of the input variable attribute values and the output variable attribute positions, it is possible to use the techniques used to predict time to predict the positions of the output variable attributes. A position represents the relative location within an array of values. In order to predict the relationship between some subset of the input variable attributes and the output variable attribute positions, a table of output position-predicting input variable attributes must be generated from the algorithm's source code. This is accomplished by first listing all input variable attributes. Next, the output variable attributes consisting of greater than zero dimensions are listed. Then the input variable attributes and their dependent variable attributes are traced to the listed output variable attributes. The initial output position relationship table is formed from the associated input variable attributes (along with its dependents) and the greater than zero-dimensional output variable attributes. Since the method used to create the relationship between the input variable attributes and the output variable attribute position requires that both input and output variable attributes to be monotonic, splines may be used as for multiple attribute time prediction. Multiple attribute relationship polynomials relating the input variable attributes to the various output variable attributes that are greater than zero dimensions are generated and saved in the final output position relationship table.

Since the parallel processing method shown here requires the run-time distribution of input dataset attributes (as shown in 5.2 above), the output dataset attributes need to be reassembled to obtain the final answer. The input variable attributes given to each processing element are used along with the TALP's associated output position relationship table to put the output variable attribute values into their correct positions.

5.4 Automatic Cross Communication Determination

Referring to FIGS. 26-32, consider that cross communication implies that the processing of some dataset that has been spread across multiple PEs requires data to be shared by some or all of those PEs prior to completing the processing. There are three times when data can be shared in the system 100: the TALP execution start, the TALP execution end, and sometime between the TALP's execution start and end.

Figure 26:
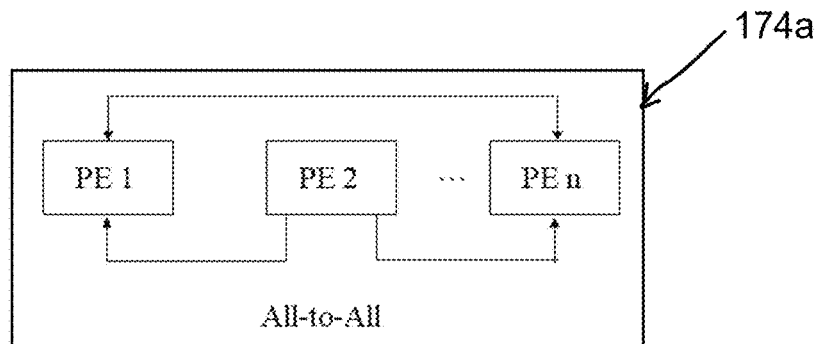
FIGS. 26-32 show data movement patterns with exemplary stencils, in accordance with embodiments of the present invention.
Figure 27:
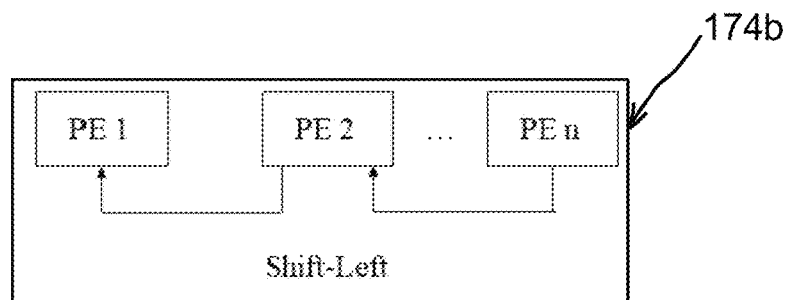
Figure 28:
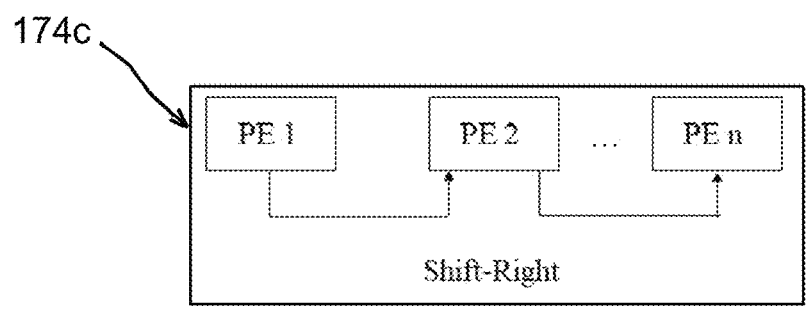
Figure 29:
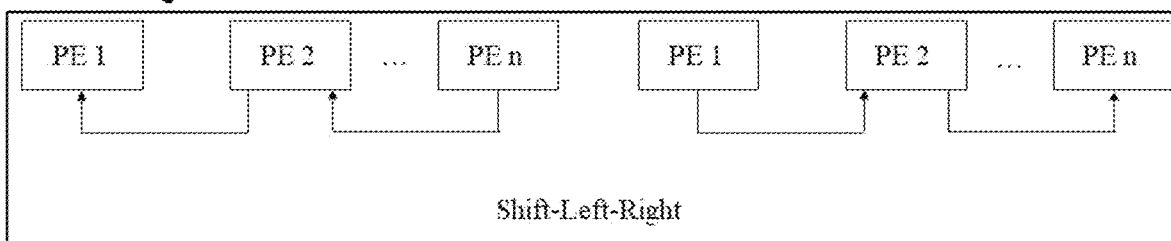

A data-movement stencil 174 is the pattern accessed by random access memory (RAM) and used by some TALP. Although it is not obvious, data-movement stencils can also be used to determine which loop structures require cross-communication as well as the type of cross-communication that is required. For example, if there is a data-movement stencil whose size is greater than or equal to the array size and if the array elements are independent, then the work can be performed on multiple PEs using all-to-all cross-communication 174a since here all PEs share data with all other PEs, as shown in FIG. 26. In this case, any element can be transmitted as long as it has interacted with all required array elements within the PE. This element is transmitted to all other PEs where it is combined at the end with all required array elements within the receiving PE. Many of the standard cross-communication models are simply degenerative cases of the all-to-all exchange. Note that the start of an arrow becomes a "send" function in the TALP and the arrowhead becomes a "receive" function.

5.4.1 Single Dimension Exchange Detection

Left Cross-Communication Exchange: These exchanges only occur for one-dimensional arrays and can be detected using the pattern 174b shown in FIG. 27.

Right Cross-communication Exchange: These exchanges only occur for one-dimensional arrays, as shown with the pattern 174c of FIG. 28.

Left-Right Cross-Communication Exchange: These exchanges also only occur for one-dimensional arrays, as shown with the pattern 174d of FIG. 29.

5.4.2 Two-Dimensional Exchange Detection

Figure 30:
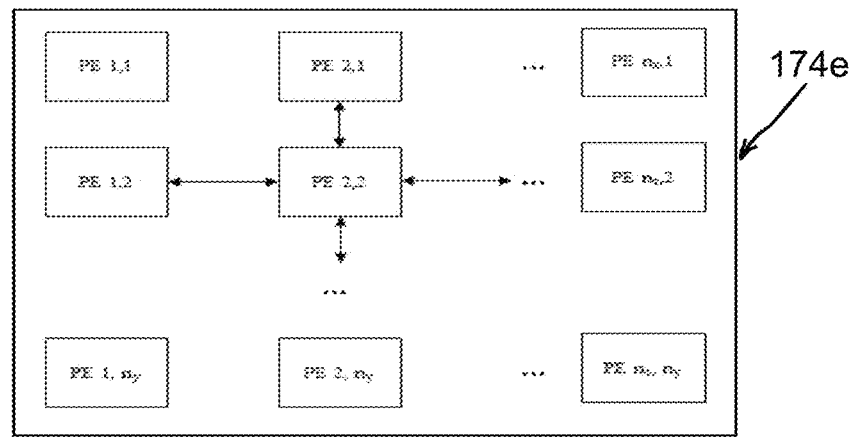

Checker-Board Exchange (Left-Right-Up-Down) Detection Pattern: Checker-Board exchanges can occur for two-dimensional arrays and higher. FIG. 30 shows this exchange pattern 174e for a two-dimensional array. Higher dimensional arrays behave analogously.

Figure 31:
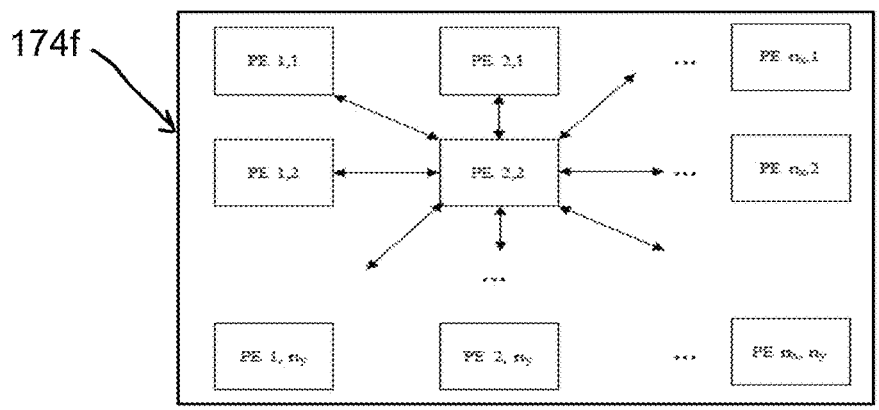

Next-N-Neighbor Exchange Detection Pattern: The next-n-neighbor exchange can occur for one-dimensional arrays, called a left-right exchange, or for n-dimensional arrays between all adjacent elements in the same array for all dimensions. FIG. 31 shows an example pattern 174f for two dimensions; higher dimensional arrays behave analogously.

Figure 32:
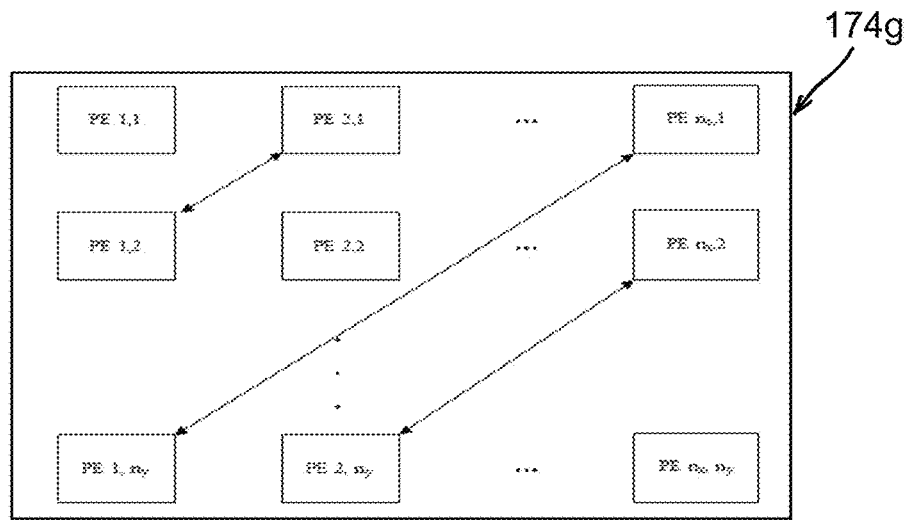

Transpose Exchange Detection Pattern: A transpose exchanges the dimensions of some array. A one-dimensional array has no transpose. A two-dimensional array exchanges rows for columns. A three-dimensional array can exchange rows for columns, rows for depths, or columns for depths. Higher dimensional arrays behave analogously. FIG. 32 is an example pattern 174f of two-dimensional array transpose exchange detection across multiple PEs.

5.5 Automatic Maximum TALP Speedup Prediction

Knowing how much faster an algorithm will process data using multiple PEs versus a single PE is an important metric. Speedup, the single PE time divided by the maximum multi-PE time, $t_1/t_{min}$, uses the time complexity calculation. Since n represents the number of PEs or the number of pieces into which each attribute value in set w is divided, n can be represented by $w_1/w_n$. Since $n_{max}$ is the maximum number of pieces into which w can be split and can be represented by $w_1/w_{min}$ and since the processing time of $w_1=t_1$ and of $w_{min}=t_{min}$, $n_{max}=w_1/w_{min} \to S(w_1/w_{min})=t_1/t_{min} \to S(n_{max})=t_1/t_{min}$. We can now define the speedup of a TALP as:

$$s_{TALP}(n_{max}) = \frac{t_1 \times tu}{t_{min} \times tu} = \frac{\left(\frac{t_1}{t_{min}}\right)}{\left(\frac{t_{min}}{t_{min}}\right)} \to \frac{T_{TALP}\left(\frac{w_1}{w_{min}}\right)}{T_{TALP}\left(\frac{w_{min}}{w_{min}}\right)} = \frac{\left(t_s + \hbar_{TALP,v}\left(\frac{w_1}{w_{min}}\right)\right)}{\left(t_s + \hbar_{TALP,v}(1)\right)} = \frac{t_s + t_v}{t_s + 1}$$

The maximum speedup for a TALP with the set w containing multiple attribute values is handled analogously, using the multiple-element version of time complexity.

5.6 Automatic Parallel Processing Overhead Determination

There are two types of overhead: parallelization setup and cross communication. Parallelization-setup overhead determines how much slower the single-instance parallel TALP is than the original pathway through an algorithm that is analogous to the TALP. This measures the setup processing-time cost incurred in creating and parallelizing a TALP. Cross-communication overhead determines how much slower a parallelized version of the TALP without cross communication is to the parallelized version of the same TALP with cross communication. This measures the processing-time cost incurred in cross communicating.

Since determining parallelization setup overhead requires knowing the single-instance value of the input variable attribute, we need to set the number of PEs to one (1) in the parallel TALP time complexity.

$$T_{TALP\_p\_single\_instance}(w_1, n=1) = \left(l_s + c_s + \hbar_{TALP}\left(\frac{\left(\frac{w_1}{w_{min}}\right)}{1}\right) \times t_{min}\right) \times tu$$

If a time complexity for the original pathway which will become the TALP, $T_{pathway}(w_1)$, is generated then, since it is always executed using a single PE, the parallel processing overhead can be defined as $T_{pathway}(w_1)$ divided by $T_{TALP,p\_single\_instance}(w_1)$. The percentage of processing overhead from parallelization can now be given as:

$$O_{TALP\_parallelization}(w_1, n=1) = \left(1 - \frac{T_{pathway}(w_1)}{T_{TALP,p\_single\_instance}(w_1, n=1)}\right) \times 100$$

If a time complexity is generated for a TALP prior to the insertion of the send and receive functions required for cross-communication, $T_{TALP\_no\_comm}(w_1, n)$, and after send and receive functions are inserted, $T_{TALP\_comm}(w_1, PE)$, then cross-communication overhead can be defined as $T_{TALP\_comm}(w_1, n)$ divided by $T_{TALP\_no\_comm}(w_1, n)$. The percentage of processing overhead from cross-communication can now be given as:

$$O_{TALP\_crossCommunication}(w_1, n) = \left(1 - \frac{T_{TALP\_comm}(w_1, n)}{T_{TALP\_no\_comm}(w_1, n)}\right) \times 100$$

The total parallel overhead is the parallelization overhead plus the cross-communication overhead:

$$O_{TALP}(w_1,n) = O_{TALP\_parallelization}(w_1,n) + O_{TALP\_crossCommunication}(w_1,n)$$

5.7 Automatic TALP Parallel Processing Power Consumption Determination

Understanding the on-going power consumption of a TALP requires knowing the processing time and the energy cost of all PEs used by the TALP. The power consumption calculation is the processing time of a TALP multiplied by the number of PEs used to obtain that processing time multiplied by the number of watts.

$$P_{TALP,p}(w_1,n) = T_{TALP,p}(w_1,n) \times tu \times \text{watts}$$

Because watts are joules per second, the time units must be converted to seconds to match.

$$P_{TALP,p}(w_1,n) = T_{TALP,p}(w_1,n) \times n_{max} \times \text{converter} \times \text{seconds} \times \text{joules/seconds}$$

where converter=the coefficient that converts tu into seconds

5.8 Automatic TALP Parallel Processing Accuracy

Figure 33:
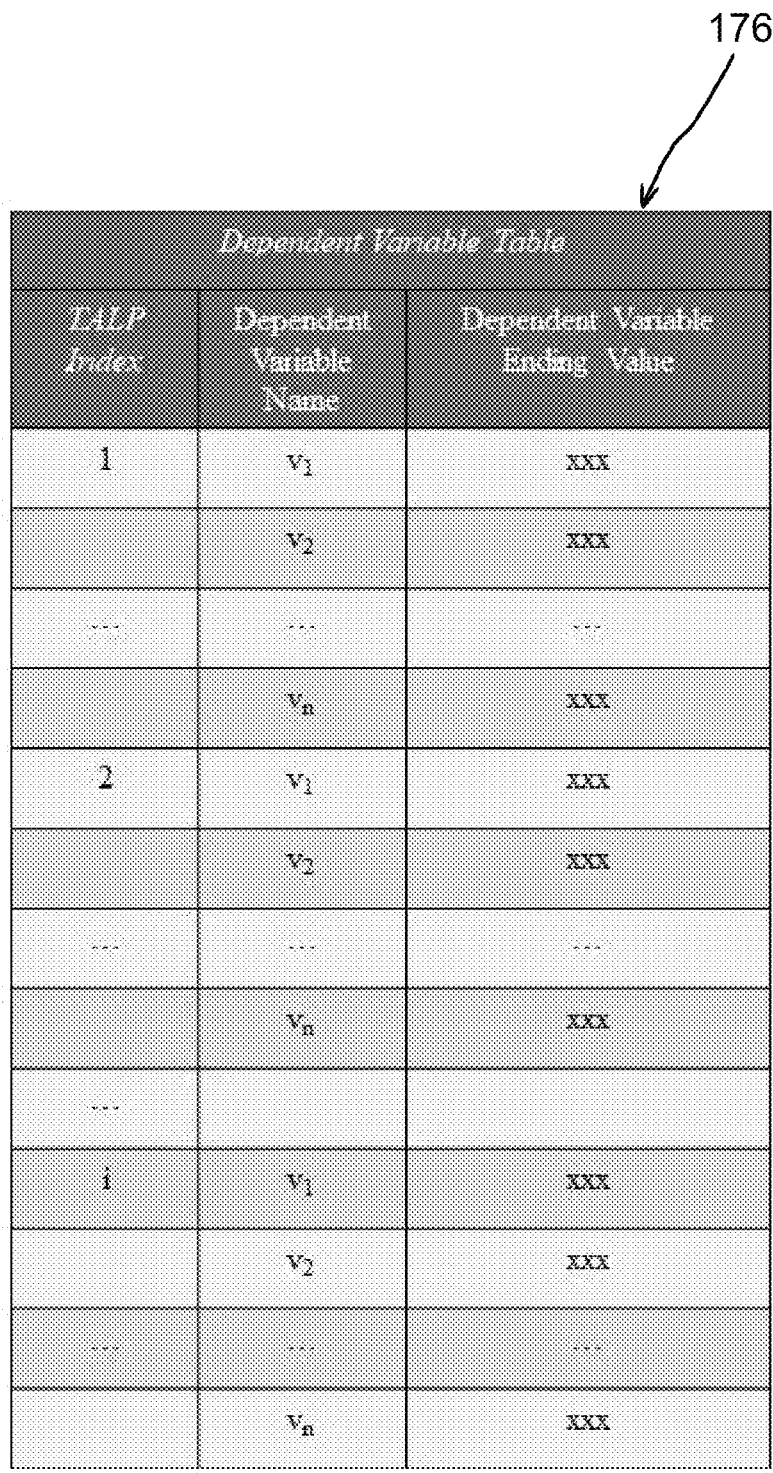
FIG. 33 shows an exemplary dependent variable table, in accordance with embodiments of the present invention.

TALPs contain both dependent and independent variables. In the source code of computer languages like C, dependent variables are always to the left of an equal sign while independent variables are always to the right. Referring to FIG. 33, the set of dependent variables, d, along with their final values, can be created by executing the TALP and storing all dependent variable values in a table called the Dependent Variable Table 176, $DVT_{TALP}$.

If a DVT is also created for an execution pathway before it is identified as a TALP, then the sets of dependent variables from the pathway and the TALP are compared, and any error between them can be calculated. Given dependent-variable ending values from a TALP labeled $\mathcal{F}_i$ and from the pathway $\mathcal{P}_i$, and given that $\mathcal{F}_i$ and $\mathcal{P}_i$ represent analogous dependent variables, then the maximum error is:

$$DVT_{maxError} = \max\left\{\left\{\frac{|\mathcal{P}_1 - \mathcal{F}_1|}{\mathcal{P}_1} \times 100, \frac{|\mathcal{P}_2 - \mathcal{F}_2|}{\mathcal{P}_2} \times 100, \ldots, \frac{|\mathcal{P}_i - \mathcal{F}_i|}{\mathcal{P}_i} \times 100,\right\}\right\}$$

6 Using TALPs in Quantum Computing

Figure 34:
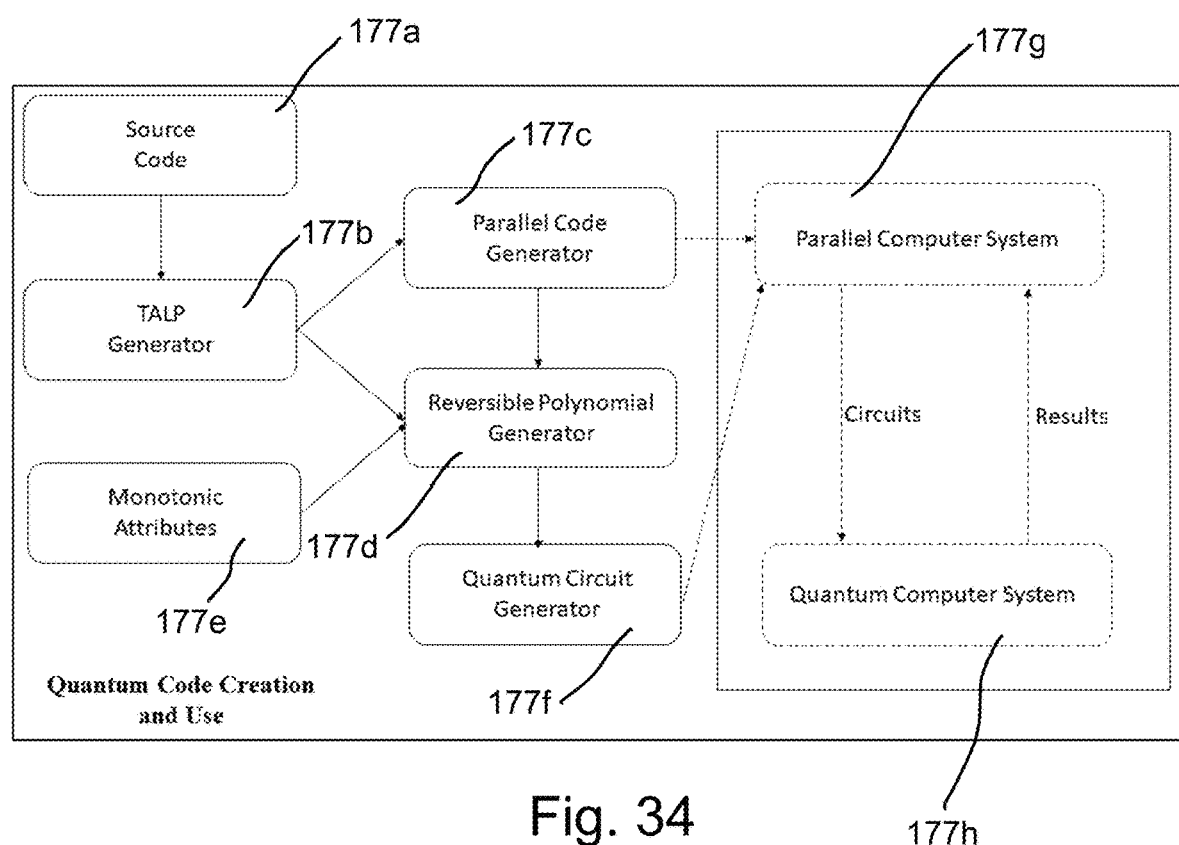
FIG. 34 shows an exemplary diagram of quantum code creation using TALPs, in accordance with embodiments of the present invention.

Referring to the diagram 177 of FIG. 34, TALPs can be utilized in quantum computing applications as well. In certain embodiments, the process includes the original source code 177a, which is fed to a TALP generator 177b. Also included is a parallel code generator 177c and a reversible polynomial generator 177d, both of which receive information from the TALP generator 177b. Further, the reversible polynomial generator 177d receives monotonic attributes 177e. The results from the reversible polynomial generator 177d are fed to a quantum circuit generator 177f, with the parallel code generator 177c and the quantum circuit generator 177f feeding to the parallel computer system 177g, which is operatively integrated with and/or communicating with the quantum computer system 177h.

Any function can be processed on a quantum computer. However, to realize the advantage of quantum computing over classical computing requires the function to be reversible and, thus, able to form reversible logic gates which are zero entropic. Reversibility is the same requirement needed to create an inverse time prediction polynomial. Dr. Richard Feynman, who gave much of the theoretical underpinning for quantum computing, noted that any algorithm could be created using only reversible functions and that a quantum gate version of any algorithm could be created from reversible functions. Quantum gate versions of algorithms perform better than classical algorithms only in the case where the algorithm could take advantage of quantum superposition and/or quantum entanglement, called inherently quantum algorithms.

Feynman's ideas were used to support the rewriting of algorithms into reversible function form. The system 100 of the current invention automatically extracts the reversible function form from source code.

As previously shown in this disclosure, any set of monotonic input attributes associated with a set of monotonic output attributes, called the monotonic condition, can be used to generate predictive polynomials and as long as the monotonic condition is met, an inverse polynomial can be created. It has also been shown here that it is possible to take non-monotonic but continuous attribute values and convert those values into a set of monotonic splines. This means that a reversible function can be generated automatically using the methods of the current invention.

Meeting the monotonic condition also means that Runge's Phenomenon for higher-order polynomials is not in force, so under this condition higher order polynomials are also reversible. Monotonicity in a TALP that is not inherently monotonic can be achieved by deconstructing the TALP into TALP splines which are each monotonic. Since TALPs or TALP splines with predictive polynomials and inverse predictive polynomials are reversible, they are zero entropic and can be used to form quantum logic gates.

Given a monotonic condition, it is possible to use the techniques taught herein to also predict the output variable values. In order to predict the relationship between some subset of the input variable attributes and the output variable values, a table of output-value-predicting input variable attributes must be generated from the algorithm's source code. All input variable attributes and their associated output variable attributes are first found and listed by the system 100, creating the initial output values relationship table. Since the method used to create the relationship between the input variable attributes and the output variable values requires the monotonic condition, splines may be used. Multiple attribute relationship polynomials relating the input variable attributes to the various output variable values are generated and saved in the final output values relationship table. Since the generated polynomials are reversible, using them instead of the original source code ensures that a reversible form of the algorithm is used and, thus, can be executed using quantum gates.

It is possible to reproduce the functionality of an algorithm with a set of zero entropy predictive polynomials, a process called TALP extraction. TALP extraction itself is not reversible since there might be many possible source code implementations that yield the same set of TALP extractions.

As Richard Feynman noted, there are engineering advantages to using multiple linked reversible functions forming a larger reversible function in quantum computing. The present disclosure has already detailed how to link together TALPs.

If the multiple attribute time prediction polynomial of a TALP extraction has $w_1/w_{min}=n$, where $w_{min}$ is the set of actual minimum attribute values possible for the TALP, then that TALP extraction is called the minimum TALP Quantum Dataset (mTQD), giving an algorithm that requires the least amount of processing time and energy.

Algorithms that generate the same set of TALP extractions executing in the same order are equivalent, making it possible to determine if two codes are the same even if code obfuscation techniques are used.

For an mTQD, in the absence of superposition or entanglement, the performance of a parallelized mTQD implementation and quantum circuit mTQD implementation is a function of the parallelized $t_{min}$ and the quantum circuit $t_{min}$ values, which for well-formed systems would be approximately the same. If a mTQD contains polynomials, with at least one term that can take advantage of either superposition or entanglement, then that mTQD will have a performance advantage when implemented using a quantum circuit instead of using parallel processing. The creation of a mTQD from a set of monotonic attribute values where no source code is available is called minimum TALP inference.

Like parallel processing, the TALPs that are in the form of reversible functions are distributed to multiple compute elements and the output variable positions are computed in the same way.

7 Non-Linear Frameworks used to Treat Non-Linear Algorithms Linearly

The advantage of using monotonic versions of algorithms to transform the algorithm into reversible form has already been shown in both parallel processing and quantum computing. Another advantage is the ability to use linear techniques on non-linear algorithms, called pseudo-linearity. An example of pseudo-linearity is shown for a projectile (e.g., drones, missiles, etc.) intercept determination. It should be noted that, as with the algorithmic forms shown in this disclosure that a reversible algorithm has been created, meaning that the example represents a non-linear intercept algorithm that can be processed using either parallel processing or quantum computing. This is generally true with all pseudo-linear algorithmic forms.

7.1 Novel Automatic Projectile Missile/Drone Intercept Determination

Figure 35:
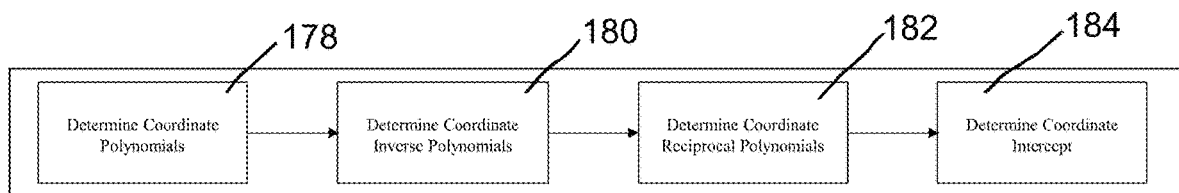
FIG. 35 shows an exemplary projectile or vehicle intercept determination process, in accordance with embodiments of the present invention.
Figure 36:
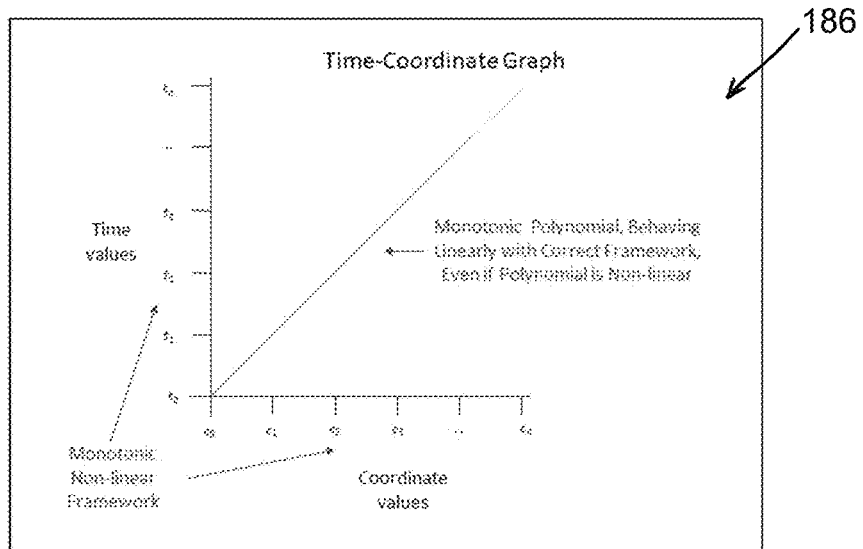
FIG. 36 shows an exemplary time-coordinate graph demonstrating a monotonic polynomial behaving linearly with correct framework, in accordance with embodiments of the present invention.

Generating predicted intercept points, PIPs, can require hundreds of thousands of calculations per PIP, limiting the number of real-time PIPs that can be calculated by a system. If the hardware of a system cannot be changed to meet the evolving need to create hundreds of simultaneous PIPs in real-time then the number of calculations per PIP must be significantly decreased. Using the techniques detailed hereinabove, the present invention will greatly decrease the processing time required to determine if one or more drones are going to collide, or alternatively determine the optimum predicted intercept point of a missile. Referring to FIG. 35, to create a PIP with these techniques, first a curve-fitting polynomial is generated for each coordinate of a detected track at step 178, using its position values and associated position detection times, and then an inverse polynomial is generated for each polynomial coordinate at step 180. The reciprocal of the polynomial of each coordinate is next created at step 182, followed by the creation of an intercept at step 184.

7.1.1 Non-linear Polynomials Behaving Linearly Within a Framework

Typically, curves are graphed in either Cartesian, polar, spherical, cylindrical, or some other system with fixed coordinates, to allow for apples-to-apples comparisons between curves. However, a monotonic section of a polynomial can be represented as the diagonal, a line, from the points of the curve generated by that section on some two-dimensional graph where the values of the axes represent the range and domain of that monotonic polynomial section, as shown with the graph 186 of FIG. 36. The symbol for a monotonic polynomial section is ℏ (c).

Figure 37:
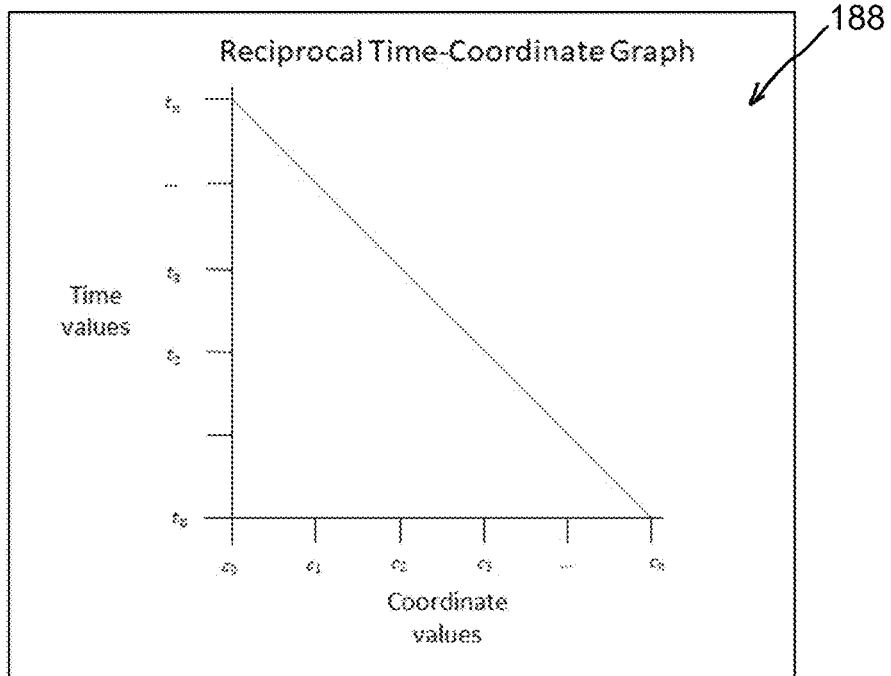
FIG. 37 shows an exemplary graph demonstrating a polynomial also behaving linearly within a framework, in accordance with embodiments of the present invention.

Referring to graph 188 of FIG. 37, the reciprocal of a polynomial that is behaving linearly within some framework also behaves linearly within that same framework. The symbol for the reciprocal of a monotonic polynomial is Ҷ (c).

Figure 38:
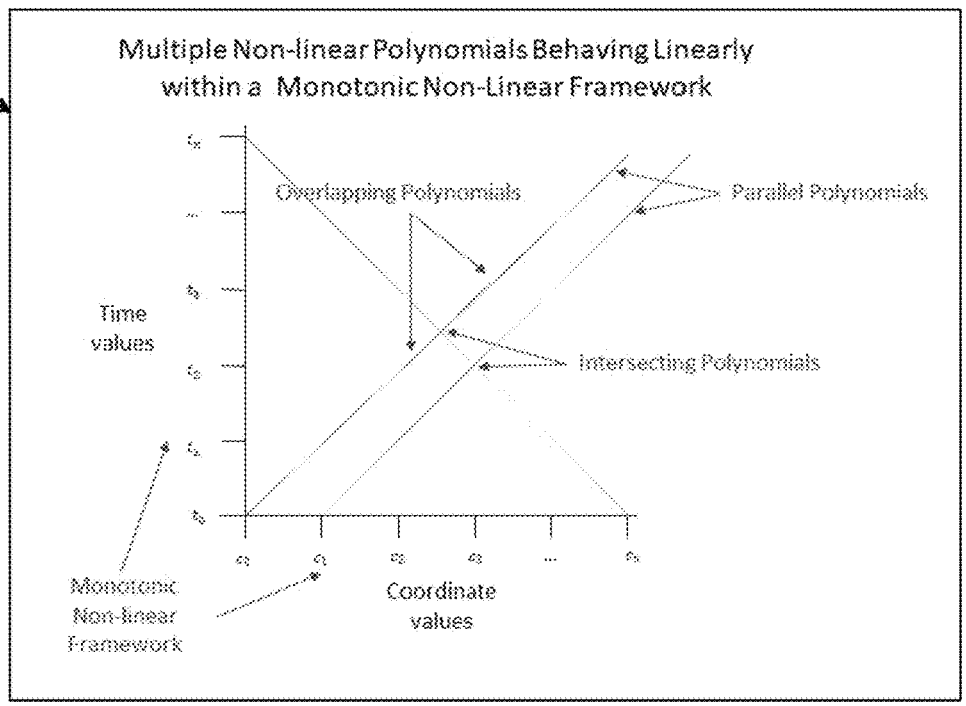
FIG. 38 shows an exemplary graph demonstrating multiple non-linear polynomials behaving linearly within a monotonic non-linear framework, in accordance with embodiments of the present invention.

Referring to graph 190 of FIG. 38, the following possible relationships—overlapping, parallel, and intersecting—can exist between polynomials that behave linearly within a framework.

7.1.2 Using Linear Tools with Non-Linear, Single Variable Polynomials Within a Framework The following equations represent the tools used by multiple, interacting monotonic polynomials behaving linearly in the same framework:

1. Reciprocal of a polynomial that behaves linearly within a framework:

$$Ҷ(c) = \frac{1}{ℏ(c)}.$$

2. Intersection of two polynomials that behave linearly within the same framework: ℏ (c)=Ҷ (c).
3. Shifting a polynomial that behaves linearly within a framework up or down by some value i: ℏ $_{shift\ up\ or\ down}$(c)=ℏ (c)±i.
4. Shifting a polynomial that behaves linearly within a framework left or right by some value i: ℏ $_{shift\ left\ or\ right}$(c)=ℏ (c±i).
5. Because the Target Values Table columns as first discussed in Section 2.1.3 share at most one row value that is the same and because the rows in a column are monotonic, then the minimum number of rows required to detect a column is two. That is, only two telemetry points are required to find the terms of a polynomial.

7.1.3 Predicted Intercept Position Using Polynomials

Existing sensors are capable of identifying a track's position in x, y, and z at some point in time t. For any track, the x, y, and z coordinate values are always related by the same time value. This means that it is possible to perform a separate analysis on each coordinate and relate them all to the common time, creating the x, y, and z interception point which is the optimum PIP. To predict the optimum point of interception, a coordinate-in-time prediction polynomial for each coordinate x, y, and z is created. A polynomial that is perpendicular to any of the coordinate-in-time prediction polynomial curves, from some "Own ship" whose analogous coordinate is not on the curve, is next created. The point of interception between the coordinate-in-time polynomial curve and the perpendicular polynomial curve represents the optimum interception point because it is the shortest interception distance.

There are two types of PIPs processed by this system 100. Type 1 is the point of intersection between the predicted coordinate-in-time polynomial curve and the perpendicular from an Own ship position not on the predicted curve. Type 2 is a point on the predicted curve that is not the position of an Own ship when it is on the predicted track curve. The existence of a Type 2 PIP means that the tracked launch vehicle is predicted to collide with the Own ship.

To determine which type of PIP calculations are required, the present system 100 performs the following steps.
1. First, the track coordinates are separated into individual x-time, y-time, and z-time coordinate value tables, the Source Value Tables of Section 1 hereinabove.
2. The time and coordinate values in each coordinate value table are scaled by the smallest time and smallest coordinate values, respectively.
3. A monotonic coordinate-to-time prediction polynomial is generated for each coordinate value table by comparing each to the Target Values Table.
4. A coordinate is selected, and the reciprocal monotonic coordinate-to-time prediction polynomial is generated and shifted to the analogous Own ship's coordinate, generating the monotonic perpendicular polynomial.
5. The interception point is the point where the monotonic coordinate-to-time prediction polynomial and the monotonic perpendicular polynomial values are equal.
6. From the interception point and the monotonic coordinate-to-time prediction polynomial, the interception time is calculated.
7. Using the inverse of the other two coordinate-to-time polynomials and the interception time, the corresponding values of the other two coordinates are calculated, together giving the complete interception point.
8. The distance from the complete interception point to the Own ship position is calculated.

If the calculated distance is outside of the maximum error value range of the monotonic coordinate-to-time prediction polynomial, then a Type 1 PIP is calculated by unscaling the time and each coordinate value. The time and value of each coordinate is multiplied by its respective smallest unscaled value to give the real-time optimal Type I PIP.

If the calculated distance is within the maximum error value range of the monotonic coordinate-to-time prediction polynomial, then a Type 2 PIP is calculated. In a Type 2 PIP, an intercept can take place on any coordinate position that is not the Own ship's coordinate position as long as it occurs before the Own ship's position is reached. The further away that the intercept occurs, the better, as long as the probability of an intercept is high enough. Given the interceptor data with the associated probability of intercept as a function of distance, if the present system 100 receives an acceptable probability of intercept, then subtracting the furthest distance that has the acceptable probability from the Own ship's position gives the optimum intercept position. To unscale, the time and value of each coordinate is multiplied by each respective smallest unscaled value to give the real-time optimal Type 2 PIP.

Assumptions for the PIP-Creation Steps Based on the Concepts

Separating the coordinates simplifies and reduces the number of polynomial-generation calculations.

Scaling the values of a polynomial does not change the nature of the polynomial. Being able to scale the input values decreases the number of Target Values Table rows that are required for comparison to a reasonable number, typically less than one hundred, for example.

Because the Target Values Table is ordered, a binary search can be performed.

The shortest distance between a line in some framework and a point not on the line in the same framework is a line perpendicular that line and the point. The reciprocal of the original line is a perpendicular to that line. This perpendicular can be shifted by adding to the input value of the perpendicular. Thus, any point along the c-axis can have its perpendicular calculated.

The intersection of the perpendicular polynomial and the polynomial is the point where the computed polynomial time equals the computed perpendicular polynomial time and represents an intercept point. Since the optimum PIP is the point on the polynomial curve that is the shortest distance to the Own ship position, and since the perpendicular intersection is the point of shortest distance, then this calculation creates the optimum Type 1 PIP.

The shared point between the original and perpendicular polynomials is used in the original polynomial to give the optimum PIP intercept time.

If there are multiple monotonic coordinates whose behavior is linked by one of the axes, such as time, but are otherwise independent, then it is possible to solve for one of the coordinates and, using the inverse polynomial and the shared axes' value, find the other coordinate values. Since the polynomials generated using the above method are always monotonic in both their ranges and domains, they are invertible. Since each coordinate shares the same processing time, finding the PIP of one coordinate allows the found PIP's intercept time to be used to find the other coordinate values. This is accomplished by using the inverse of the polynomials for the other coordinates with the found PIP's intercept time used as input.

Figure 39:
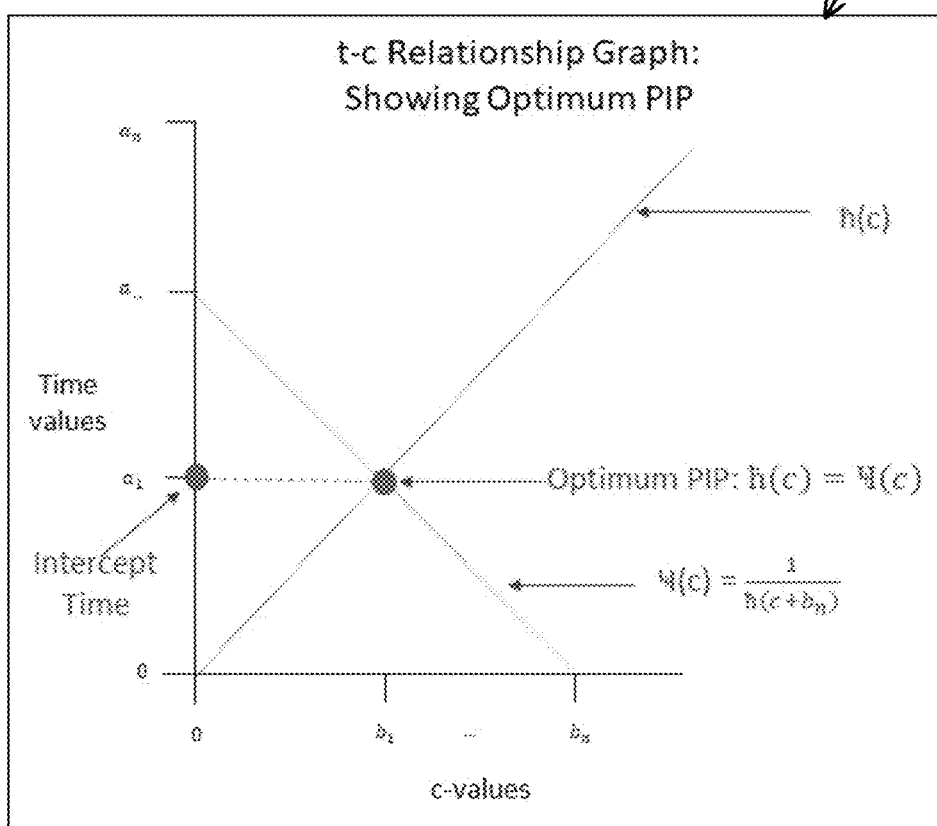
FIG. 39 shows an exemplary time-c values relationship graph demonstrating optimum predicted intercept points (PIP), in accordance with embodiments of the present invention.

Referring to graph 192 of FIG. 39, since the input values used to generate the polynomials of each coordinate were scaled, the final values must be unscaled. To unscale the coordinate values, the calculated intercept coordinate values are multiplied by the minimum value of the original coordinate input value used to create the polynomial of that coordinate. To unscale the intercept time, the calculated intercept time value is multiplied by the original input minimum time value.

Compared to the hundreds of thousands of calculations required by conventional methods, this method is computationally inexpensive. Because only two data points need to be detected, the proposed solution's calculations can begin earlier than existing methods. Thus, the proposed solution of the present invention offers the opportunity to greatly increase the number of real-time PIPs generated per processing element without sacrificing existing capabilities.

It should be noted that any continuous, function can be decomposed into a series of monotonic functions separated by range. This increases the usefulness of this technique.

7.1.4 Decluttering

The following represent clutter tracks. A target track has an interceptor launch scheduled while a clutter track does not. Tracks that would normally be considered target tracks can be treated as clutter tracks if one of the following conditions occurs:

1. If there is an acceptable Identification, Friend, or Foe (IFF) signal associated with the track,
2. If the track is within a range, altitude, sector, or area gate,
3. If the Own ship lies along the track but the track velocity equals the Own ship velocity,
4. If there is a Type I optimum PIP for the track which is the furthest position used to create the predicted coordinate-in-time polynomial curve.

7.1.5 Interceptor Launch Scheduling

Figure 40:
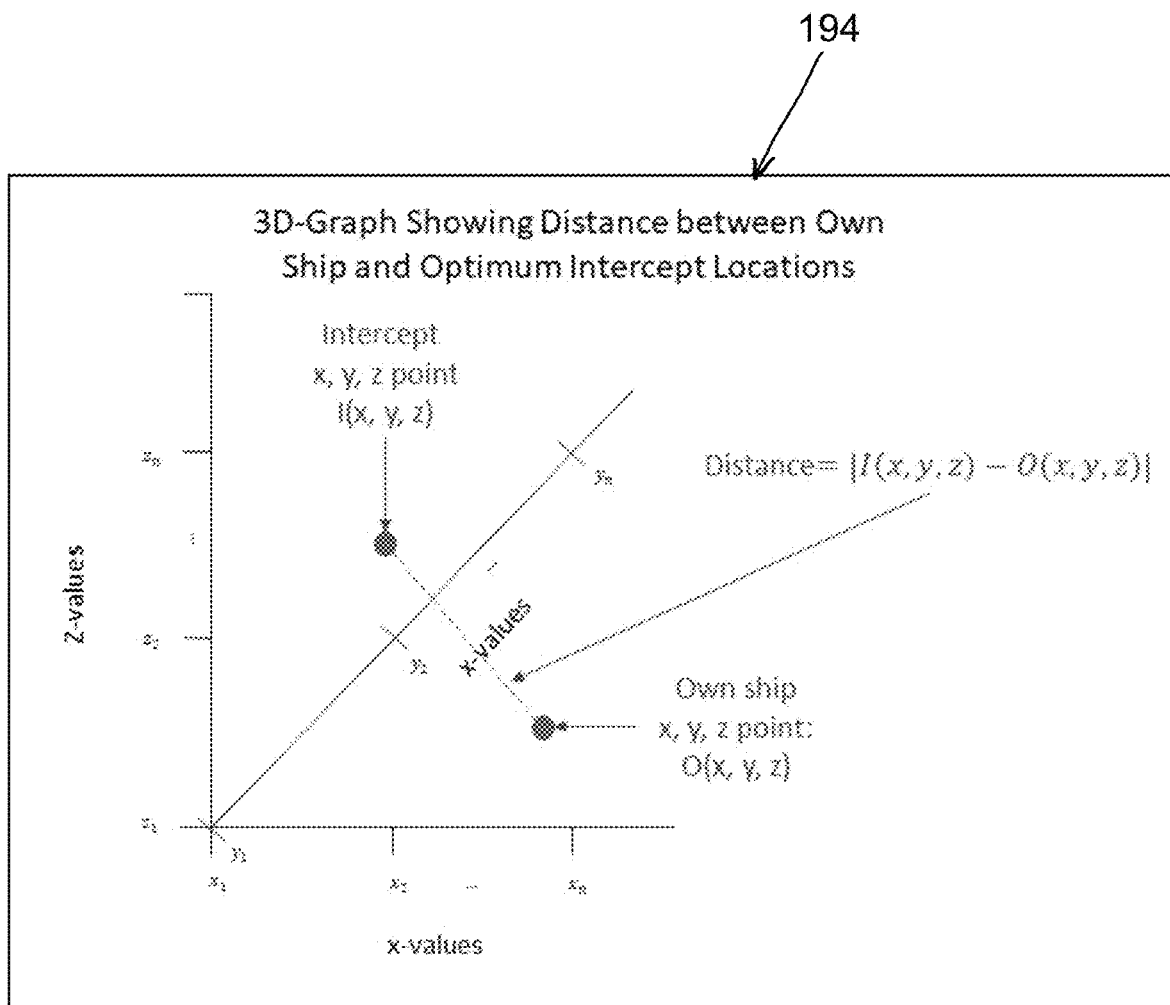
FIG. 40 shows an exemplary graph demonstrating distance between "Own ship" and optimum intercept locations, in accordance with embodiments of the present invention.

Referring to graph 194 of FIG. 40, once the x, y, z position of the optimum PIP is found, I(x, y, z), the distance between the Own ship's x, y, z position, O(x, y, z), and the PIP position can be calculated as the absolute value of the difference between I(x, y, z) and O(x, y, z).

To determine the launch time, first an associated interceptor's average velocity, $I_v$ is multiplied by the distance, d, giving the flight time, $F_t$. Next, the flight time is subtracted from the optimum intercept time, $I_t$ giving the interceptor-scheduled launch time, $S_t$.

$$d = |I(x,y,z) - O(x,y,z)|,$$

$$F_t = d \times I_v,$$

$$S_t = I_t - F_t$$

Where d=the distance between intercept and the Own ship, I(x, y, z)=the position of optimum intercept, O(x, y, z)=the position of the Own ship, $F_t$=the interceptor flight time, $I_v$=the interceptor average velocity, $S_t$=the scheduled launch time, and $I_t$=the optimum intercept time.

8 Conclusion

While various embodiments have been described above, it should be understood that they have been presented by way of example only, and not limitation. Thus, the breadth and scope of the present disclosure should not be limited by any of the above-described embodiments or examples. Moreover, any combination of the above-described elements in all possible variations thereof is encompassed by the disclosure unless otherwise indicated herein or otherwise clearly contradicted by context.

References to methods and steps such as inputting, processing, entering, and the like can include manual user inputs, or direct generation and insertion/inclusion of data via the software of the present system 100.

Additionally, while the methods described above and illustrated in the drawings may be shown as a sequence of steps or processes, this was done solely for the sake of illustration. Accordingly, it is contemplated that some steps may be added, some steps may be omitted, the order of steps may be re-arranged, and some steps may be performed in parallel.

It will be readily apparent to those of ordinary skill in the art that many modifications and equivalent arrangements and methodologies can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A method of decomposing a software code, comprising:
   receiving a software algorithm;
   creating a source values table and a target values table, the source values table having scaled input-variable attribute values and scaled monotonic processing time values, and the target values table having scaled attribute values and associated time values;
   determining a plurality of time-affecting linear pathways (TALPs) of the software algorithm;
   determining input dataset attributes that affect a processing time of each of the plurality of TALPs;
   determining input dataset attribute values that identify each of the plurality of TALPs;
   separating the plurality of TALPs such that each of the plurality of TALPs is individually compilable and executable;
   comparing the scaled monotonic processing time values of the source values table to the associated time values of the target values table; and
   creating a final polynomial based on the comparison.

2. The method of claim 1, wherein at least one of the plurality of TALPs includes a loop.

3. The method of claim 1, wherein at least one of the plurality of TALPs includes a subroutine, method, or module (SMM) call.

4. The method of claim 1, wherein at least two of the plurality of TALPs are linked together.

5. The method of claim 1, wherein the comparison includes a binary search process.

6. The method of claim 1, wherein the target values table includes polynomial terms.

7. A method of determining a quantum code from a time-affecting linear pathway (TALP) parallel component, comprising:
   receiving the TALP parallel component;
   deconstructing the TALP parallel component into a plurality of TALP splines;
   determining one or more input dataset attribute values for the TALP parallel component that varies output dataset attribute values of the TALP parallel component;
   splitting the one or more input dataset attribute values into a plurality of monotonic input dataset lists that generate a plurality of monotonic output values;
   recombining the plurality of monotonic output values into a set of output values;
   calculating a reversible polynomial for each of the plurality of monotonic input dataset lists; and
   generating a quantum circuit for each reversible polynomial.

8. The method of claim 7, further including providing a parallel code generator.

9. The method of claim 7, further including providing a reversible polynomial generator.

10. The method of claim 7, further including providing a quantum circuit generator.

11. The method of claim 7, wherein the TALP splines are reversible.

12. The method of claim 11, further including creating one or more quantum logic gates.

13. A method of determining time complexity of a software unit, comprising:
   receiving a time-affecting linear pathway (TALP);
   creating a source values table and a target values table, the source values table having scaled input-variable attribute values and scaled monotonic processing time values, and the target values table having scaled attribute values and associated time values;
   determining a plurality of parallel components for the TALP;
   receiving a dataset for each of the plurality of parallel components;
   determining one or more dataset splits for the dataset of each of the plurality of parallel components and one or more timing values;
   calculating a time complexity for each of the plurality of parallel components based on the one or more dataset splits and the one or more timing values;
   comparing the scaled monotonic processing time values of the source values table to the associated time values of the target values table; and
   creating a final polynomial based on the comparison.

* * * * *